US009898845B2

(12) United States Patent
Kawasaki et al.

(10) Patent No.: US 9,898,845 B2
(45) Date of Patent: Feb. 20, 2018

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Hiromasa Kawasaki, Tokyo (JP); Tadanori Nakatsuka, Kawasaki (JP); Kinya Honda, Kawasaki (JP); Taeko Yamazaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/791,070

(22) Filed: Jul. 2, 2015

(65) Prior Publication Data

US 2016/0005203 A1 Jan. 7, 2016

(30) Foreign Application Priority Data

Jul. 7, 2014 (JP) ................................ 2014-139868
Oct. 10, 2014 (JP) ................................ 2014-209332

(51) Int. Cl.

*G06K 9/00* (2006.01)
*G06T 11/60* (2006.01)
*G06T 11/20* (2006.01)
*G06K 9/32* (2006.01)

(52) U.S. Cl.

CPC .......... *G06T 11/60* (2013.01); *G06K 9/00456* (2013.01); *G06K 9/00463* (2013.01); *G06T 11/203* (2013.01); *G06T 11/206* (2013.01); *G06K 9/3275* (2013.01); *G06K 2009/00489* (2013.01); *G06K 2209/01* (2013.01); *G06T 2210/22* (2013.01)

(58) Field of Classification Search

USPC ..... 382/163, 162, 107, 112, 266; 348/208.1, 348/208.4, 207.1, 222.1; 358/448, 522
See application file for complete search history.

(56) References Cited

U.S. PATENT DOCUMENTS 8,508,599 B2 * 8/2013 Miyasako .......... G06K 9/00261 348/208.1
8,855,375 B2 * 10/2014 Macciola ............... H04N 1/387 358/448

FOREIGN PATENT DOCUMENTS

JP 2001-094760 A 4/2001

OTHER PUBLICATIONS

Microsoft Excel 2010 (https://support.office.com/en-us/article/Apply-or-remove-cell-shading-e2fd54c4-0eb9-4306-ba16-408de230922e).*

* cited by examiner

*Primary Examiner* — Anh Do
(74) *Attorney, Agent, or Firm* — Canon USA, Inc., IP Division

(57) ABSTRACT

In a case where a position of a recognized cell is shifted from a position of a ruled line of an actual cell, if the recognized cell is deleted, a part of the ruled line of the actual cell is deleted. According to an aspect of the present invention, straight lines are detected from regions around four sides constituting the recognized cell, and an inside of a region surrounded by the detected straight lines is deleted.

22 Claims, 27 Drawing Sheets

FIG. 3

Prior Art

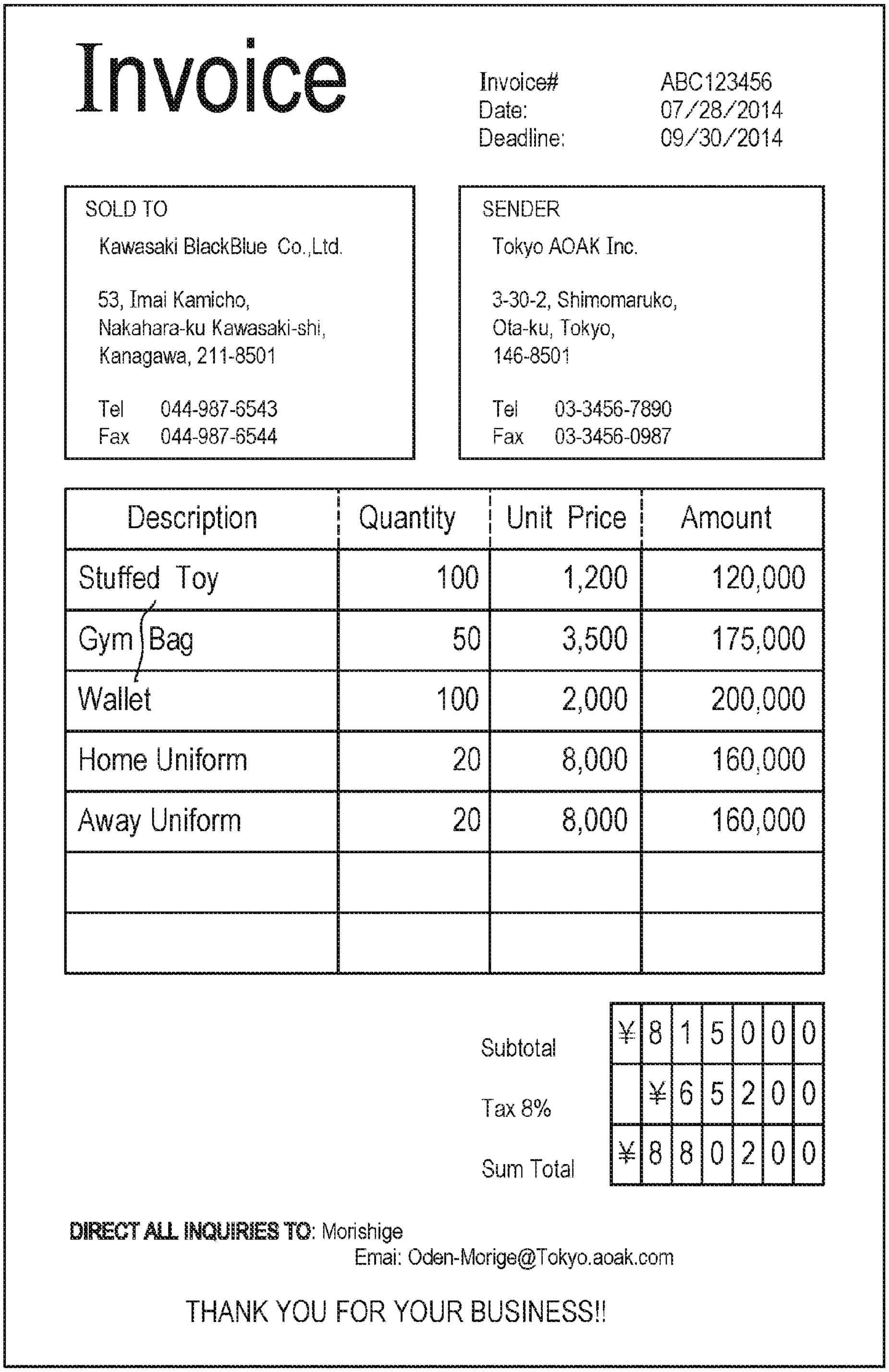

Invoice

Invoice# ABC123456
Date: 07/28/2014
Deadline: 09/30/2014

SOLD TO
Kawasaki BlackBlue Co.,Ltd.

53, Imai Kamicho,
Nakahara-ku Kawasaki-shi,
Kanagawa, 211-8501

Tel 044-987-6543
Fax 044-987-6544

SENDER
Tokyo AOAK Inc.

3-30-2, Shimomaruko,
Ota-ku, Tokyo,
146-8501

Tel 03-3456-7890
Fax 03-3456-0987

| Description | Quantity | Unit Price | Amount |
|---|---|---|---|
| Stuffed Toy | 100 | 1,200 | 120,000 |
| Gym Bag | 50 | 3,500 | 175,000 |
| Wallet | 100 | 2,000 | 200,000 |
| Home Uniform | 20 | 8,000 | 160,000 |
| Away Uniform | 20 | 8,000 | 160,000 |
| | | | |
| | | | |

| | | | | | | | |
|---|---|---|---|---|---|---|---|
| Subtotal | ¥ | 8 | 1 | 5 | 0 | 0 | 0 |
| Tax 8% | | ¥ | 6 | 5 | 2 | 0 | 0 |
| Sum Total | ¥ | 8 | 8 | 0 | 2 | 0 | 0 |

DIRECT ALL INQUIRIES TO: Morishige
Emai: Oden-Morige@Tokyo.aoak.com

THANK YOU FOR YOUR BUSINESS!!

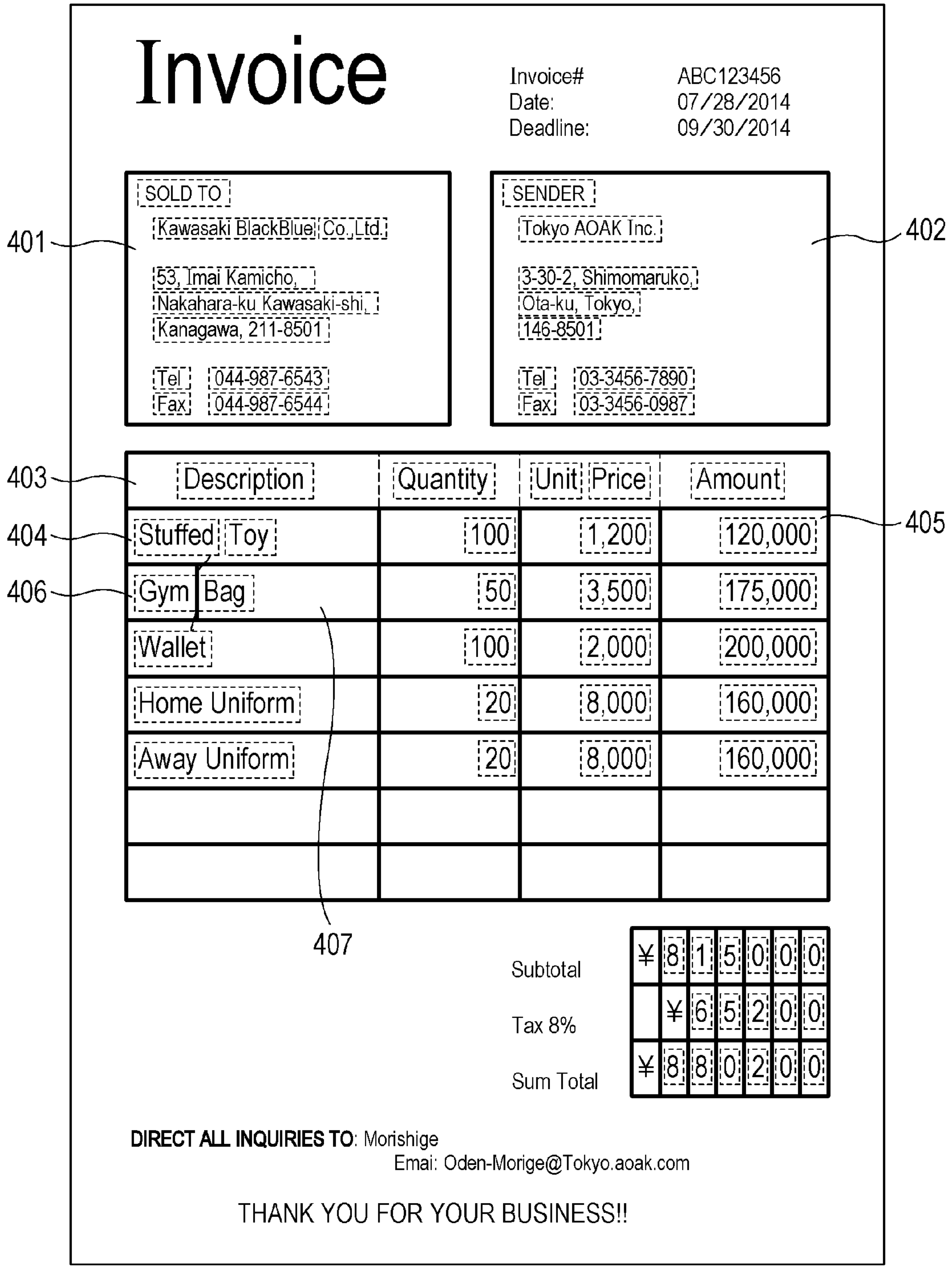

FIG. 4

Invoice

Invoice# ABC123456
Date: 07/28/2014
Deadline: 09/30/2014

401 — SOLD TO
Kawasaki BlackBlue Co., Ltd.

53, Imai Kamicho,
Nakahara-ku Kawasaki-shi,
Kanagawa, 211-8501

Tel: 044-987-6543
Fax: 044-987-6544

402 — SENDER
Tokyo AOAK Inc.

3-30-2, Shimomaruko,
Ota-ku, Tokyo,
146-8501

Tel: 03-3456-7890
Fax: 03-3456-0987

| Description | Quantity | Unit Price | Amount |
|---|---|---|---|
| Stuffed Toy | 100 | 1,200 | 120,000 |
| Gym Bag | 50 | 3,500 | 175,000 |
| Wallet | 100 | 2,000 | 200,000 |
| Home Uniform | 20 | 8,000 | 160,000 |
| Away Uniform | 20 | 8,000 | 160,000 |
|  |  |  |  |
|  |  |  |  |

403 — Description row
404 — Stuffed Toy row
405 — Amount column
406 — Gym Bag row
407

Subtotal ¥ 8 1 5 0 0 0
Tax 8%   ¥ 6 5 2 0 0
Sum Total ¥ 8 8 0 2 0 0

DIRECT ALL INQUIRIES TO: Morishige
Emai: Oden-Morige@Tokyo.aoak.com

THANK YOU FOR YOUR BUSINESS!!

FIG. 5

Invoice

Invoice# ABC123456
Date: 07/28/2014
Deadline: 09/30/2014

SOLD TO
Kawasaki BlackBlue Co.,Ltd.

53, Imai Kamicho,
Nakahara-ku Kawasaki-shi,
Kanagawa, 211-8501

Tel 044-987-6543
Fax 044-987-6544

SENDER
Tokyo AOAK Inc.

3-30-2, Shimomaruko,
Ota-ku, Tokyo,
146-8501

Tel 03-3456-7890
Fax 03-3456-0987

| Description | Quantity | Unit Price | Amount |
|---|---|---|---|
| Stuffed Toy | 100 | 1,200 | 120,000 |
| Gym Bag | 50 | 3,500 | 175,000 |
| Wallet | 100 | 2,000 | 200,000 |
| Home Uniform | 20 | 8,000 | 160,000 |
| Away Uniform | 20 | 8,000 | 160,000 |
| | | | |
| | | | |

| | | | | | | | |
|---|---|---|---|---|---|---|---|
| Subtotal | ¥ | 8 | 1 | 5 | 0 | 0 | 0 |
| Tax 8% | | ¥ | 6 | 5 | 2 | 0 | 0 |
| Sum Total | ¥ | 8 | 8 | 0 | 2 | 0 | 0 |

DIRECT ALL INQUIRIES TO: Morishige
Emai: Oden-Morige@Tokyo.aoak.com

THANK YOU FOR YOUR BUSINESS!!

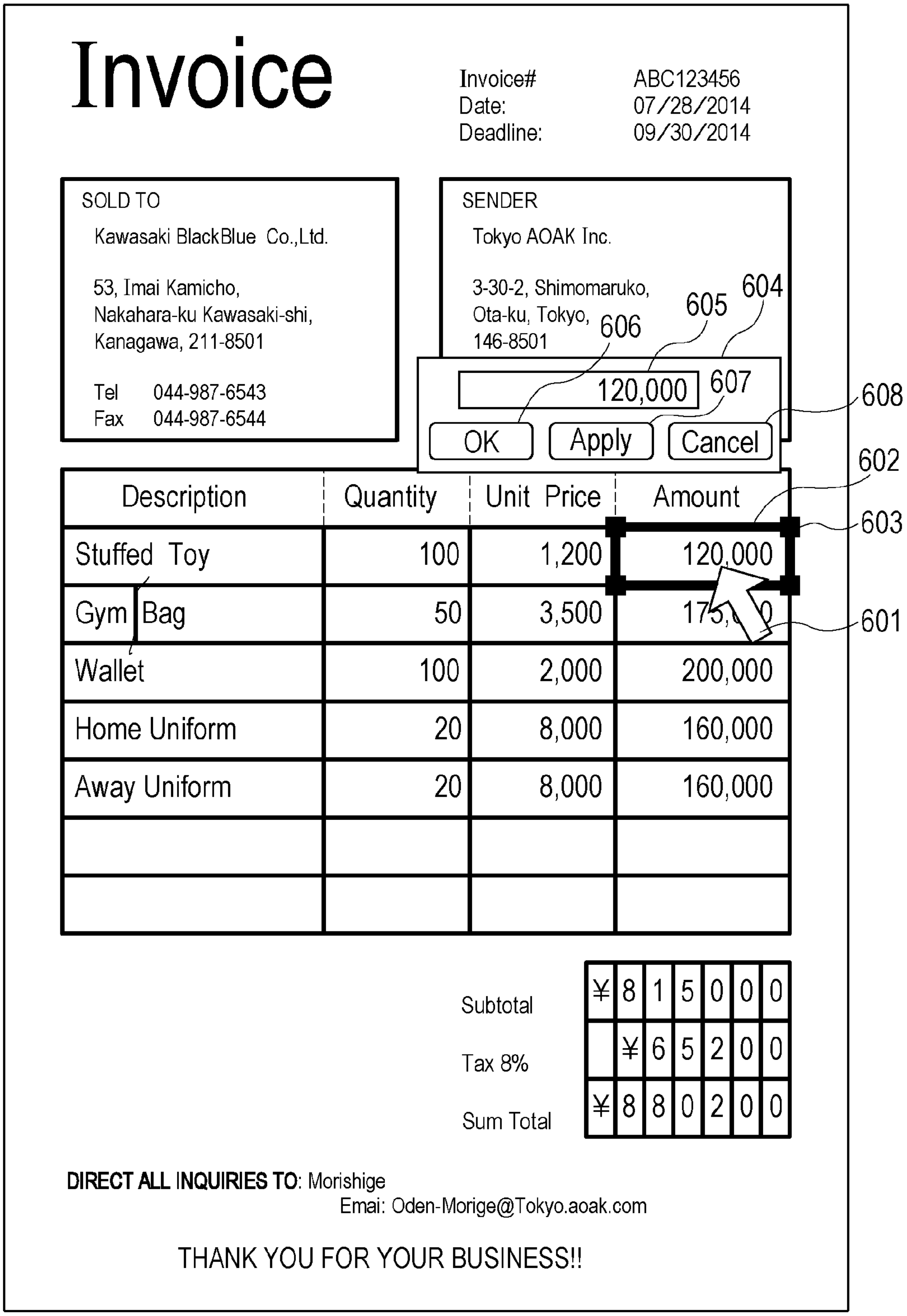

FIG. 6

Invoice

Invoice# ABC123456
Date: 07/28/2014
Deadline: 09/30/2014

SOLD TO
Kawasaki BlackBlue Co.,Ltd.

53, Imai Kamicho,
Nakahara-ku Kawasaki-shi,
Kanagawa, 211-8501

Tel   044-987-6543
Fax  044-987-6544

SENDER
Tokyo AOAK Inc.

3-30-2, Shimomaruko,
Ota-ku, Tokyo,
146-8501

606  605  604

120,000  607

[ OK ]  [ Apply ]  [ Cancel ]

608
602
603
601

| Description | Quantity | Unit Price | Amount |
|---|---|---|---|
| Stuffed Toy | 100 | 1,200 | 120,000 |
| Gym Bag | 50 | 3,500 | 175,000 |
| Wallet | 100 | 2,000 | 200,000 |
| Home Uniform | 20 | 8,000 | 160,000 |
| Away Uniform | 20 | 8,000 | 160,000 |
|  |  |  |  |
|  |  |  |  |

Subtotal  ¥ 8 1 5 0 0 0
Tax 8%   ¥ 6 5 2 0 0
Sum Total ¥ 8 8 0 2 0 0

DIRECT ALL INQUIRIES TO: Morishige
Emai: Oden-Morige@Tokyo.aoak.com

THANK YOU FOR YOUR BUSINESS!!

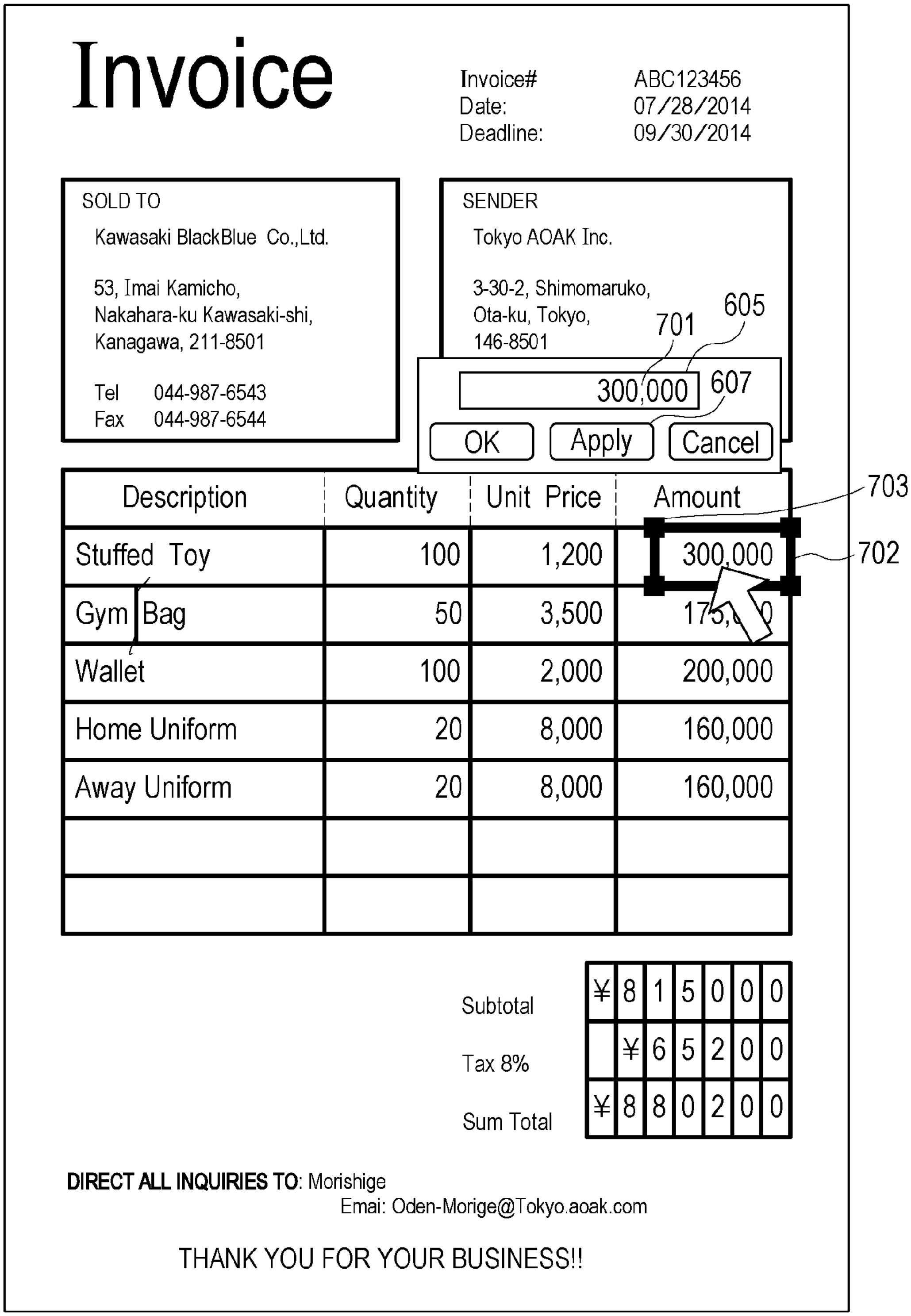

FIG. 7

Invoice

Invoice# ABC123456
Date: 07/28/2014
Deadline: 09/30/2014

SOLD TO
Kawasaki BlackBlue Co.,Ltd.

53, Imai Kamicho,
Nakahara-ku Kawasaki-shi,
Kanagawa, 211-8501

Tel 044-987-6543
Fax 044-987-6544

SENDER
Tokyo AOAK Inc.

3-30-2, Shimomaruko,
Ota-ku, Tokyo,
146-8501

300,000   —701 / 605 / 607

[ OK ] [ Apply ] [ Cancel ]

| Description | Quantity | Unit Price | Amount |
|---|---|---|---|
| Stuffed Toy | 100 | 1,200 | 300,000 |
| Gym Bag | 50 | 3,500 | 175,000 |
| Wallet | 100 | 2,000 | 200,000 |
| Home Uniform | 20 | 8,000 | 160,000 |
| Away Uniform | 20 | 8,000 | 160,000 |
|  |  |  |  |
|  |  |  |  |

—703
—702

Subtotal ¥ 8 1 5 0 0 0
Tax 8%  ¥ 6 5 2 0 0
Sum Total ¥ 8 8 0 2 0 0

DIRECT ALL INQUIRIES TO: Morishige
Emai: Oden-Morige@Tokyo.aoak.com

THANK YOU FOR YOUR BUSINESS!!

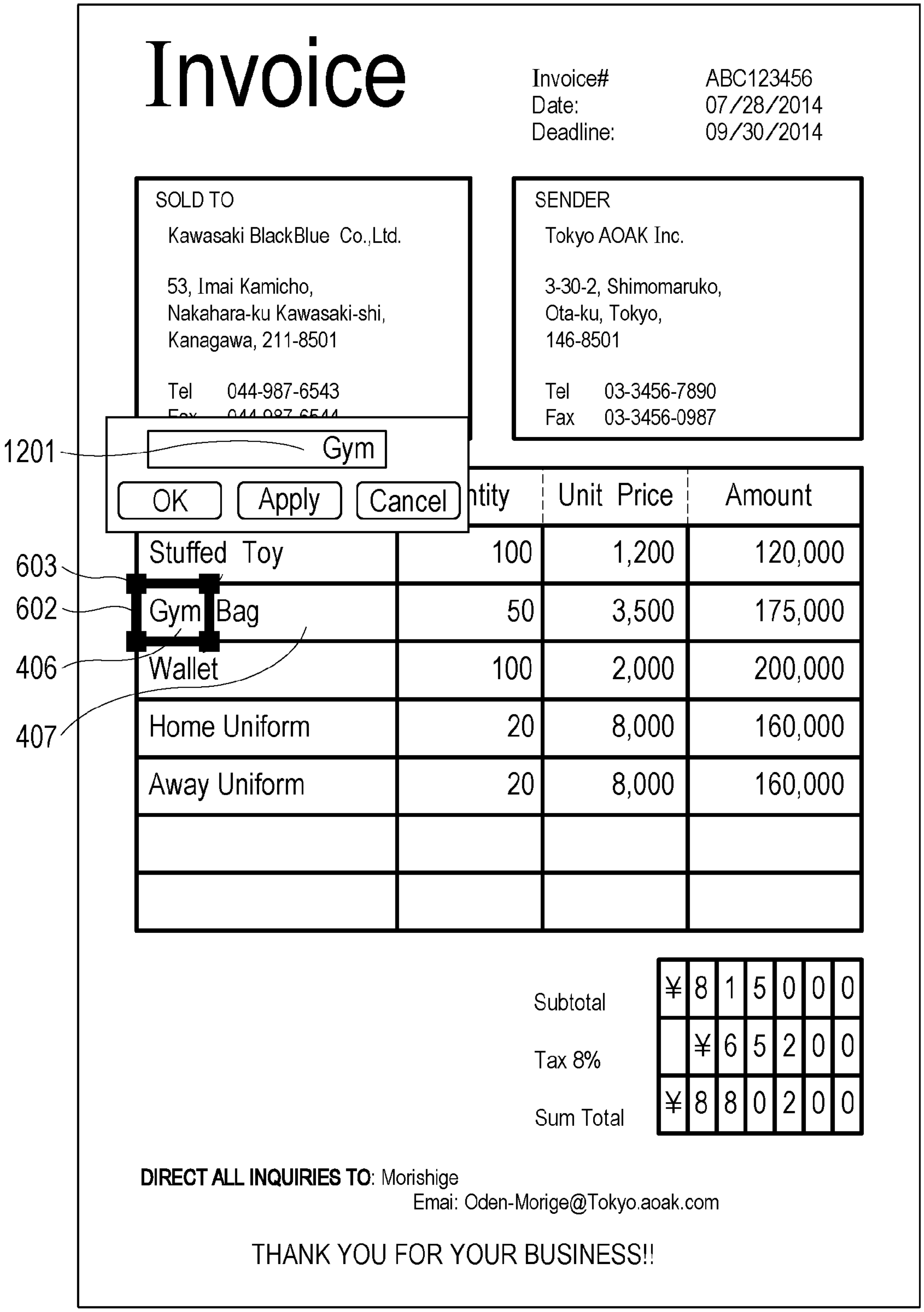

FIG. 12

Invoice

Invoice#   ABC123456
Date:      07/28/2014
Deadline:  09/30/2014

SOLD TO
Kawasaki BlackBlue Co.,Ltd.

53, Imai Kamicho,
Nakahara-ku Kawasaki-shi,
Kanagawa, 211-8501

Tel   044-987-6543
Fax   044-987-6544

SENDER
Tokyo AOAK Inc.

3-30-2, Shimomaruko,
Ota-ku, Tokyo,
146-8501

Tel   03-3456-7890
Fax   03-3456-0987

1201 — [ Gym ]
[ OK ]  [ Apply ]  [ Cancel ]

| Item | Quantity | Unit Price | Amount |
|---|---|---|---|
| Stuffed Toy | 100 | 1,200 | 120,000 |
| Gym Bag | 50 | 3,500 | 175,000 |
| Wallet | 100 | 2,000 | 200,000 |
| Home Uniform | 20 | 8,000 | 160,000 |
| Away Uniform | 20 | 8,000 | 160,000 |
|  |  |  |  |
|  |  |  |  |

Subtotal   ¥ 8 1 5 0 0 0
Tax 8%     ¥ 6 5 2 0 0
Sum Total  ¥ 8 8 0 2 0 0

DIRECT ALL INQUIRIES TO: Morishige
Emai: Oden-Morige@Tokyo.aoak.com

THANK YOU FOR YOUR BUSINESS!!

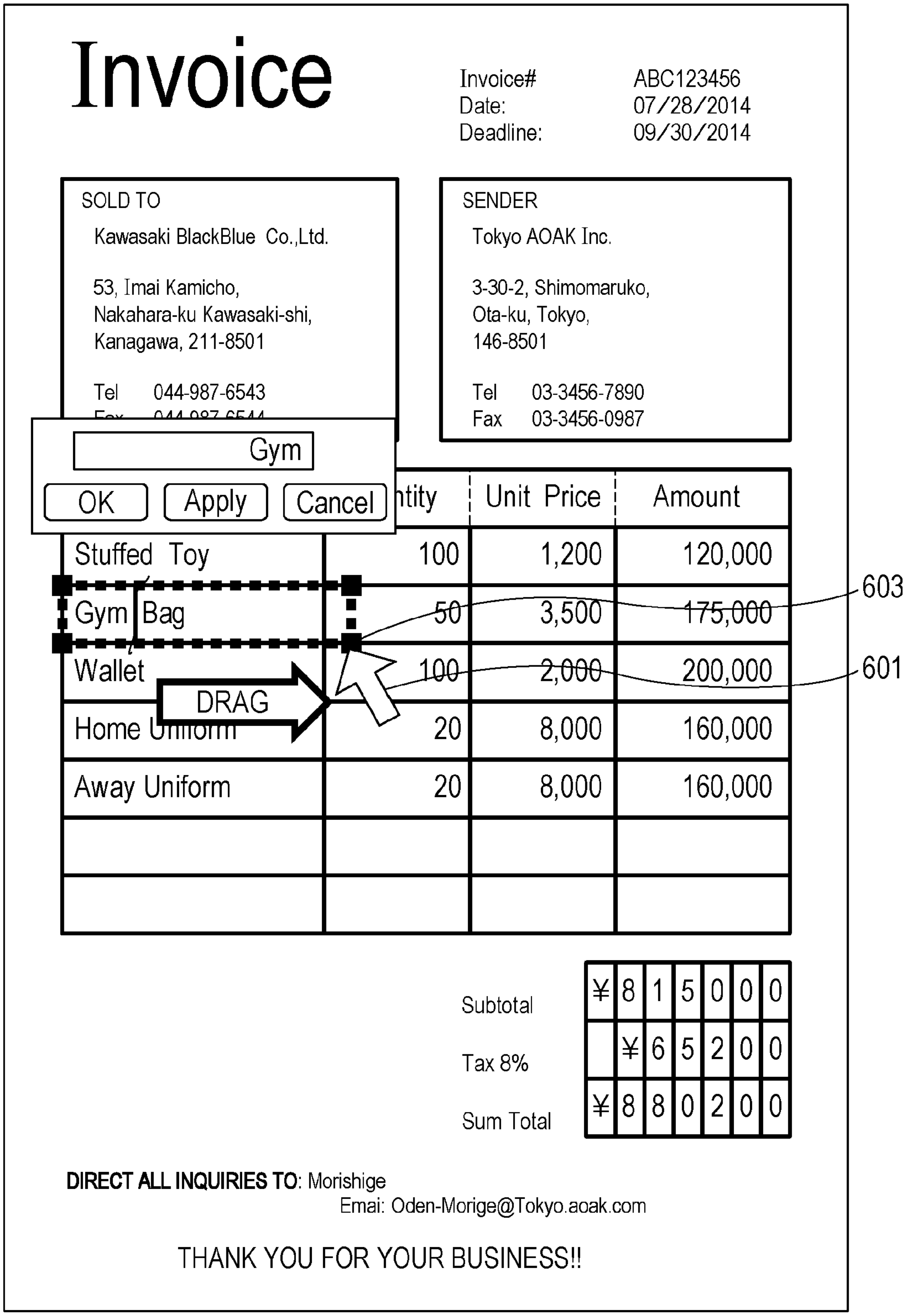

FIG. 13

Invoice

Invoice# ABC123456
Date: 07/28/2014
Deadline: 09/30/2014

SOLD TO
Kawasaki BlackBlue Co.,Ltd.

53, Imai Kamicho,
Nakahara-ku Kawasaki-shi,
Kanagawa, 211-8501

Tel  044-987-6543
Fax  044-987-6544

SENDER
Tokyo AOAK Inc.

3-30-2, Shimomaruko,
Ota-ku, Tokyo,
146-8501

Tel  03-3456-7890
Fax  03-3456-0987

| Gym |
| OK | Apply | Cancel |

| | Quantity | Unit Price | Amount |
|---|---|---|---|
| Stuffed Toy | 100 | 1,200 | 120,000 |
| Gym Bag | 50 | 3,500 | 175,000 |
| Wallet | 100 | 2,000 | 200,000 |
| Home Uniform | 20 | 8,000 | 160,000 |
| Away Uniform | 20 | 8,000 | 160,000 |
| | | | |
| | | | |

DRAG

— 603
— 601

Subtotal  ¥ 8 1 5 0 0 0
Tax 8%   ¥ 6 5 2 0 0
Sum Total ¥ 8 8 0 2 0 0

DIRECT ALL INQUIRIES TO: Morishige
　　　　　　　　Emai: Oden-Morige@Tokyo.aoak.com

THANK YOU FOR YOUR BUSINESS!!

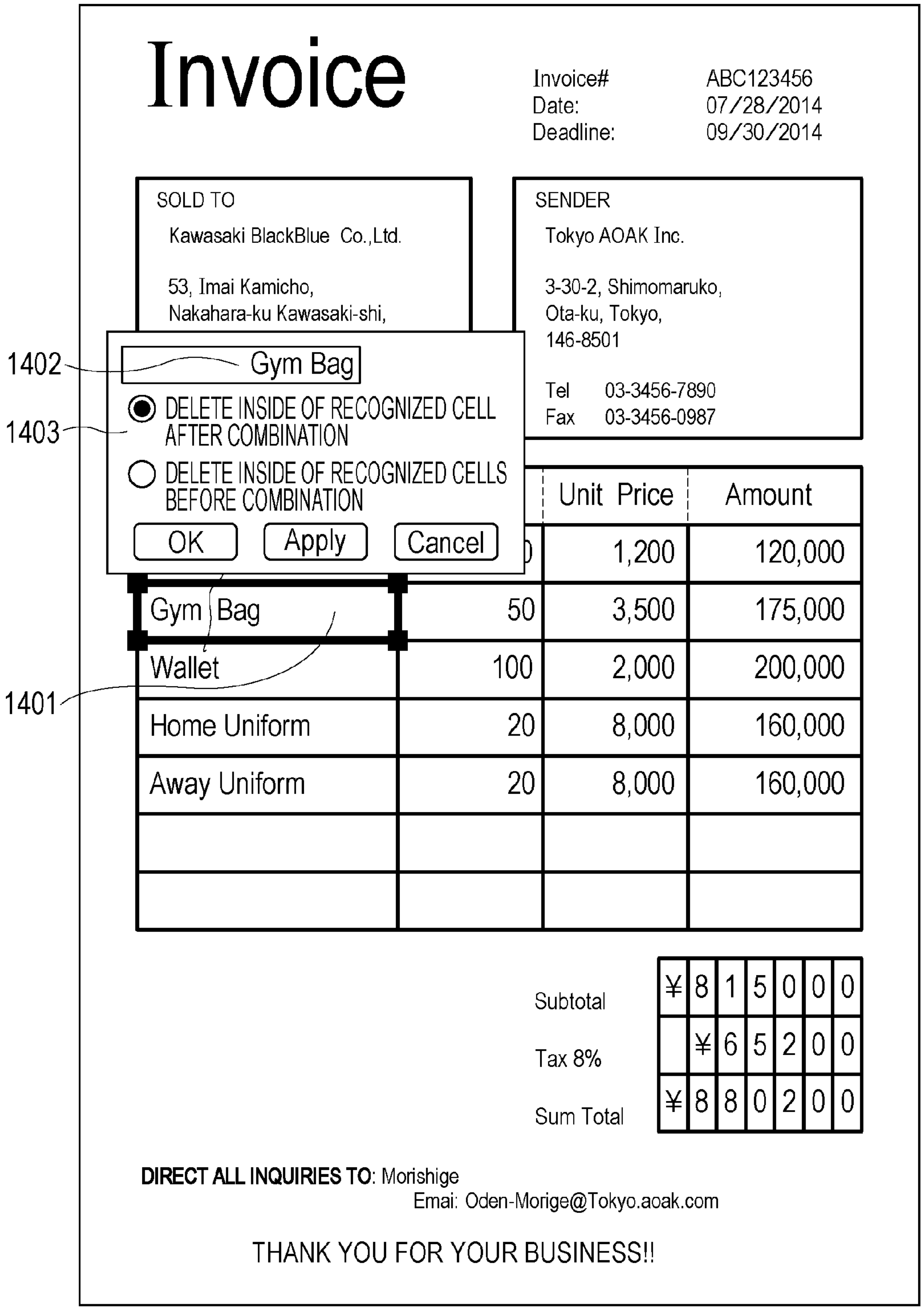

FIG. 14A

Invoice

Invoice# ABC123456
Date: 07/28/2014
Deadline: 09/30/2014

SOLD TO
Kawasaki BlackBlue Co.,Ltd.

53, Imai Kamicho,
Nakahara-ku Kawasaki-shi,

SENDER
Tokyo AOAK Inc.

3-30-2, Shimomaruko,
Ota-ku, Tokyo,
146-8501

Tel 03-3456-7890
Fax 03-3456-0987

1402 — Gym Bag
1403 — ● DELETE INSIDE OF RECOGNIZED CELL AFTER COMBINATION
○ DELETE INSIDE OF RECOGNIZED CELLS BEFORE COMBINATION

[OK] [Apply] [Cancel]

1401

| | | Unit Price | Amount |
|---|---|---|---|
| | | 1,200 | 120,000 |
| Gym Bag | 50 | 3,500 | 175,000 |
| Wallet | 100 | 2,000 | 200,000 |
| Home Uniform | 20 | 8,000 | 160,000 |
| Away Uniform | 20 | 8,000 | 160,000 |
| | | | |
| | | | |

Subtotal ¥ 8 1 5 0 0 0
Tax 8%  ¥ 6 5 2 0 0
Sum Total ¥ 8 8 0 2 0 0

DIRECT ALL INQUIRIES TO: Morishige
Email: Oden-Morige@Tokyo.aoak.com

THANK YOU FOR YOUR BUSINESS!!

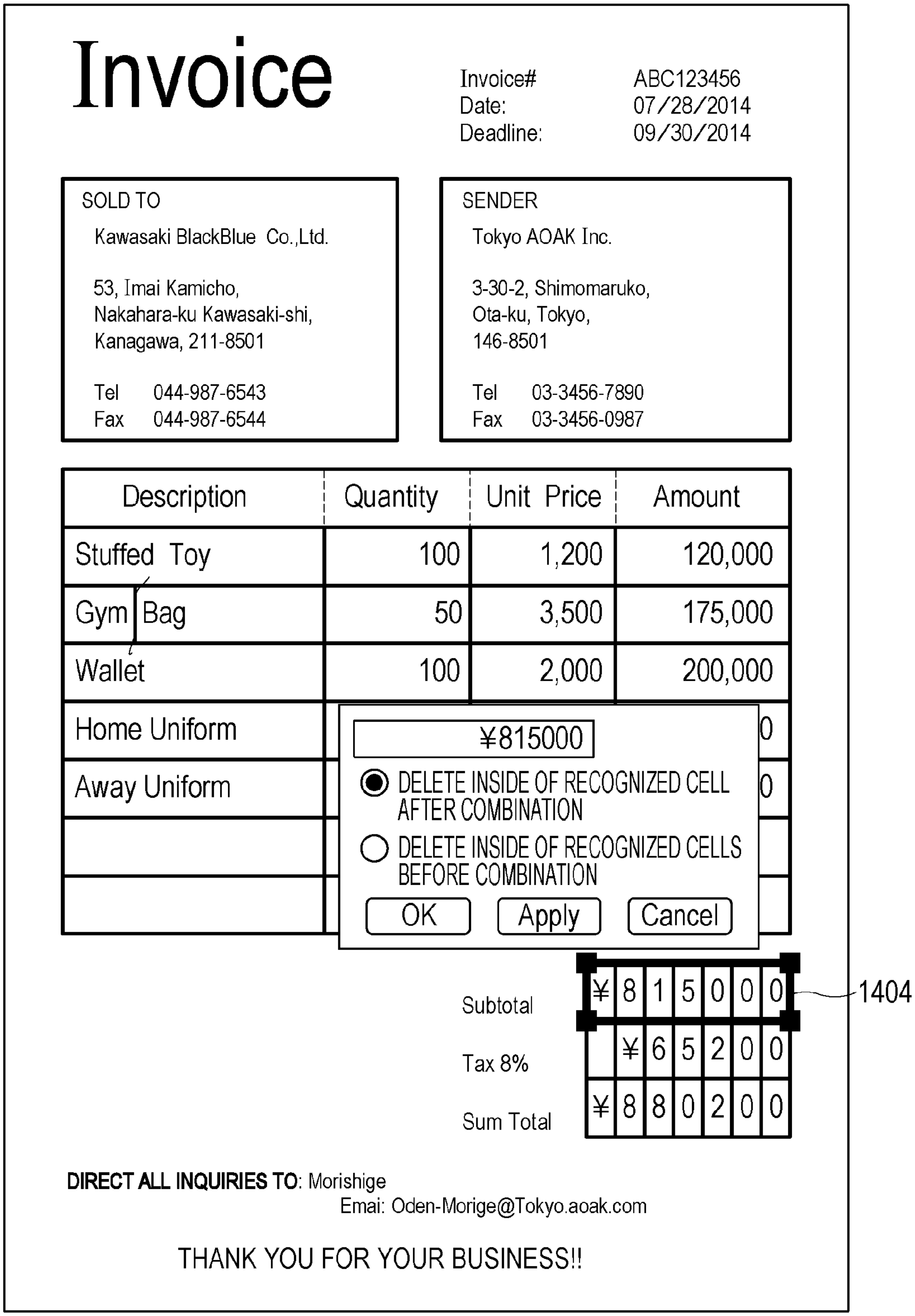

FIG. 14B

Invoice

Invoice# ABC123456
Date: 07/28/2014
Deadline: 09/30/2014

SOLD TO
Kawasaki BlackBlue Co.,Ltd.

53, Imai Kamicho,
Nakahara-ku Kawasaki-shi,
Kanagawa, 211-8501

Tel 044-987-6543
Fax 044-987-6544

SENDER
Tokyo AOAK Inc.

3-30-2, Shimomaruko,
Ota-ku, Tokyo,
146-8501

Tel 03-3456-7890
Fax 03-3456-0987

| Description | Quantity | Unit Price | Amount |
|---|---|---|---|
| Stuffed Toy | 100 | 1,200 | 120,000 |
| Gym Bag | 50 | 3,500 | 175,000 |
| Wallet | 100 | 2,000 | 200,000 |
| Home Uniform | | | |
| Away Uniform | | | |
| | | | |
| | | | |

¥815000
◉ DELETE INSIDE OF RECOGNIZED CELL AFTER COMBINATION
○ DELETE INSIDE OF RECOGNIZED CELLS BEFORE COMBINATION
[ OK ]  [ Apply ]  [ Cancel ]

Subtotal ¥ 8 1 5 0 0 0 — 1404
Tax 8% ¥ 6 5 2 0 0
Sum Total ¥ 8 8 0 2 0 0

DIRECT ALL INQUIRIES TO: Morishige
Emai: Oden-Morige@Tokyo.aoak.com

THANK YOU FOR YOUR BUSINESS!!

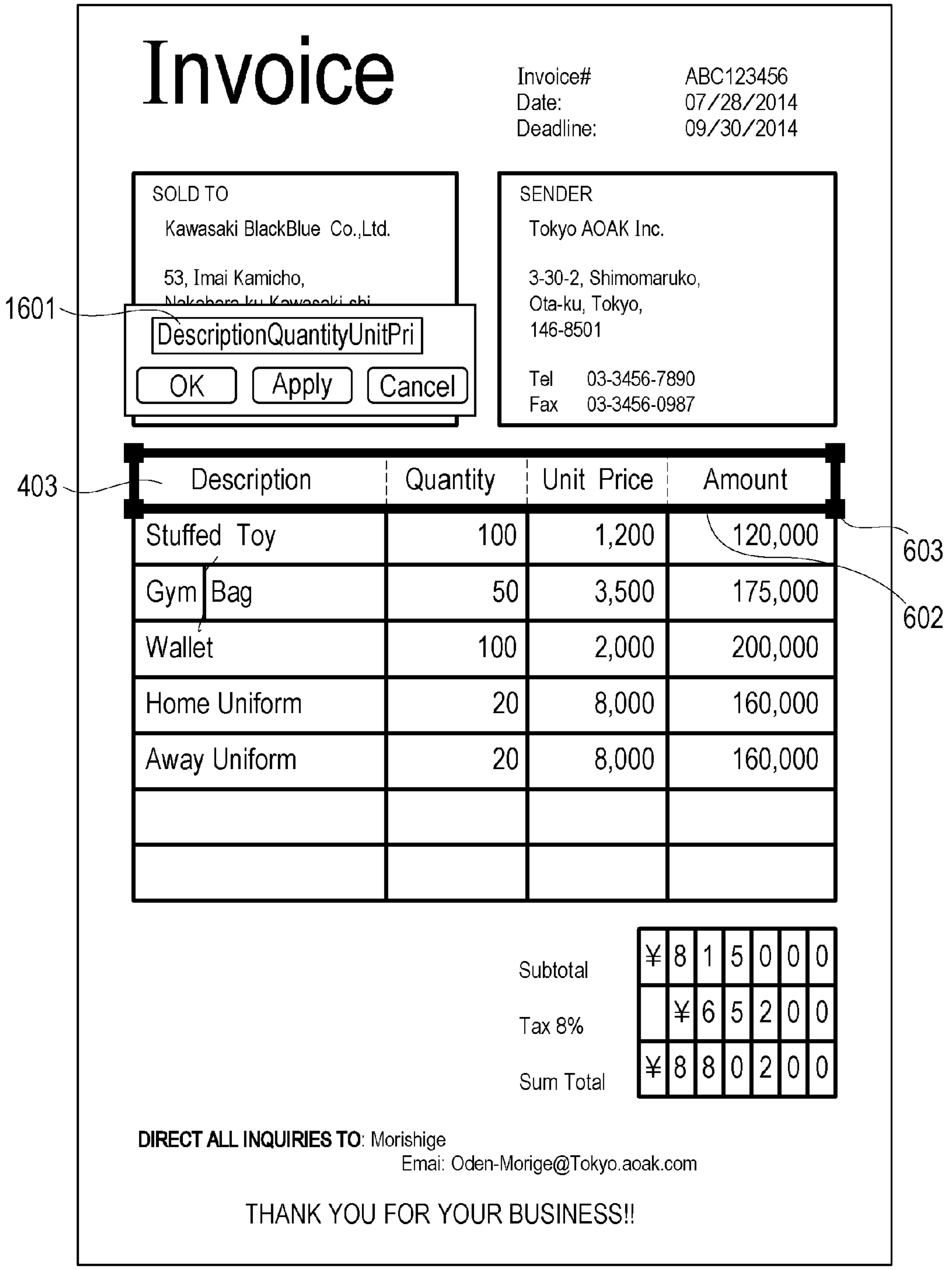

FIG. 16

Invoice

Invoice# ABC123456
Date: 07/28/2014
Deadline: 09/30/2014

SOLD TO
Kawasaki BlackBlue Co.,Ltd.

53, Imai Kamicho,
Nakahara-ku, Kawasaki-shi,

SENDER
Tokyo AOAK Inc.

3-30-2, Shimomaruko,
Ota-ku, Tokyo,
146-8501

Tel 03-3456-7890
Fax 03-3456-0987

1601: DescriptionQuantityUnitPri [OK] [Apply] [Cancel]

| Description | Quantity | Unit Price | Amount |
|---|---|---|---|
| Stuffed Toy | 100 | 1,200 | 120,000 |
| Gym Bag | 50 | 3,500 | 175,000 |
| Wallet | 100 | 2,000 | 200,000 |
| Home Uniform | 20 | 8,000 | 160,000 |
| Away Uniform | 20 | 8,000 | 160,000 |
|  |  |  |  |
|  |  |  |  |

Subtotal ¥815000
Tax 8% ¥65200
Sum Total ¥880200

DIRECT ALL INQUIRIES TO: Morishige
Email: Oden-Morige@Tokyo.aoak.com

THANK YOU FOR YOUR BUSINESS!!

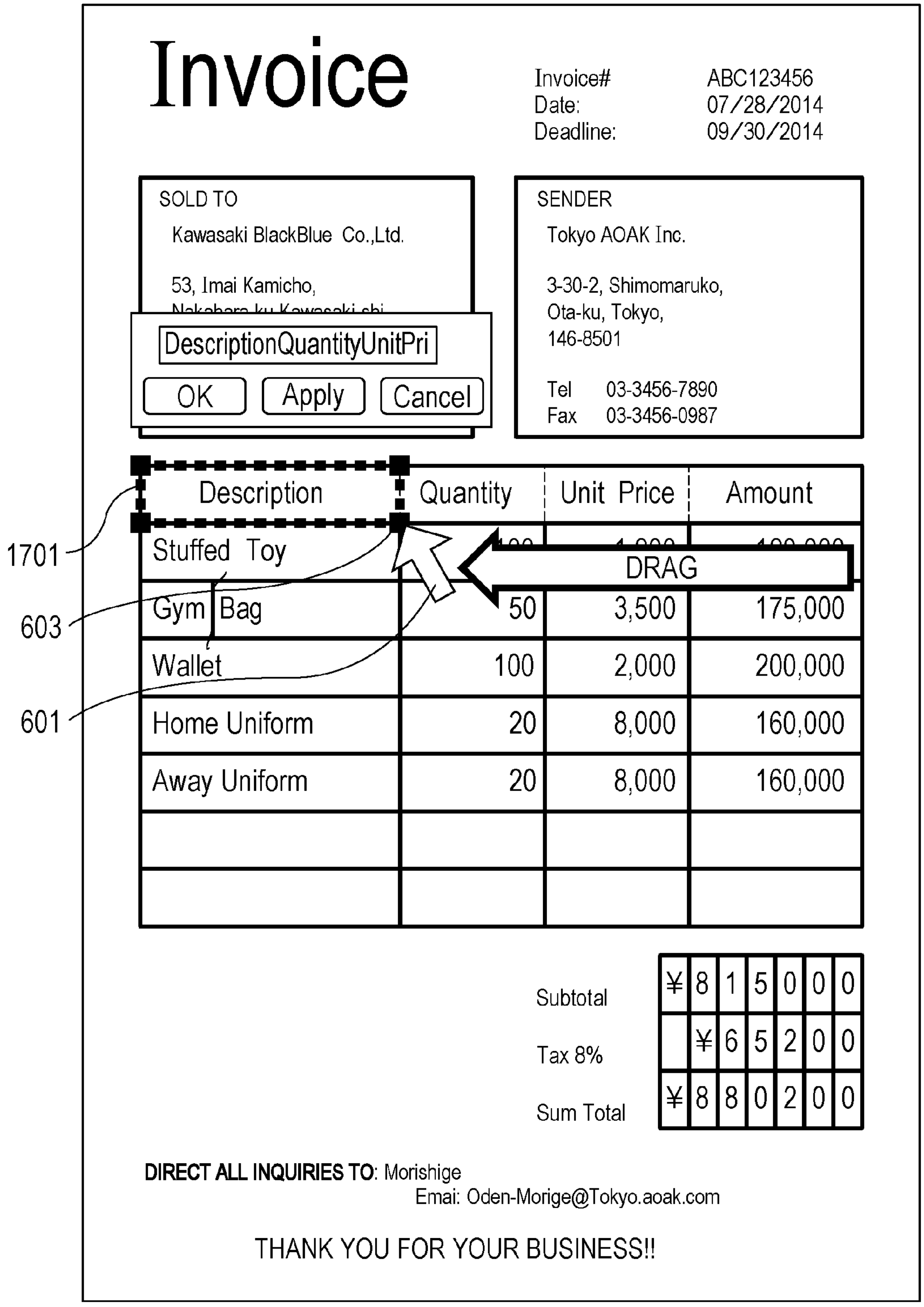

FIG. 17

Invoice

Invoice# ABC123456
Date: 07/28/2014
Deadline: 09/30/2014

SOLD TO
Kawasaki BlackBlue Co.,Ltd.

53, Imai Kamicho,
Nakahara-ku, Kawasaki-shi,

SENDER
Tokyo AOAK Inc.

3-30-2, Shimomaruko,
Ota-ku, Tokyo,
146-8501

Tel 03-3456-7890
Fax 03-3456-0987

DescriptionQuantityUnitPri
[OK] [Apply] [Cancel]

| Description | Quantity | Unit Price | Amount |
|---|---|---|---|
| Stuffed Toy | | | DRAG |
| Gym Bag | 50 | 3,500 | 175,000 |
| Wallet | 100 | 2,000 | 200,000 |
| Home Uniform | 20 | 8,000 | 160,000 |
| Away Uniform | 20 | 8,000 | 160,000 |
| | | | |
| | | | |

1701
603
601

Subtotal ¥ 8 1 5 0 0 0
Tax 8% ¥ 6 5 2 0 0
Sum Total ¥ 8 8 0 2 0 0

DIRECT ALL INQUIRIES TO: Morishige
Emai: Oden-Morige@Tokyo.aoak.com

THANK YOU FOR YOUR BUSINESS!!

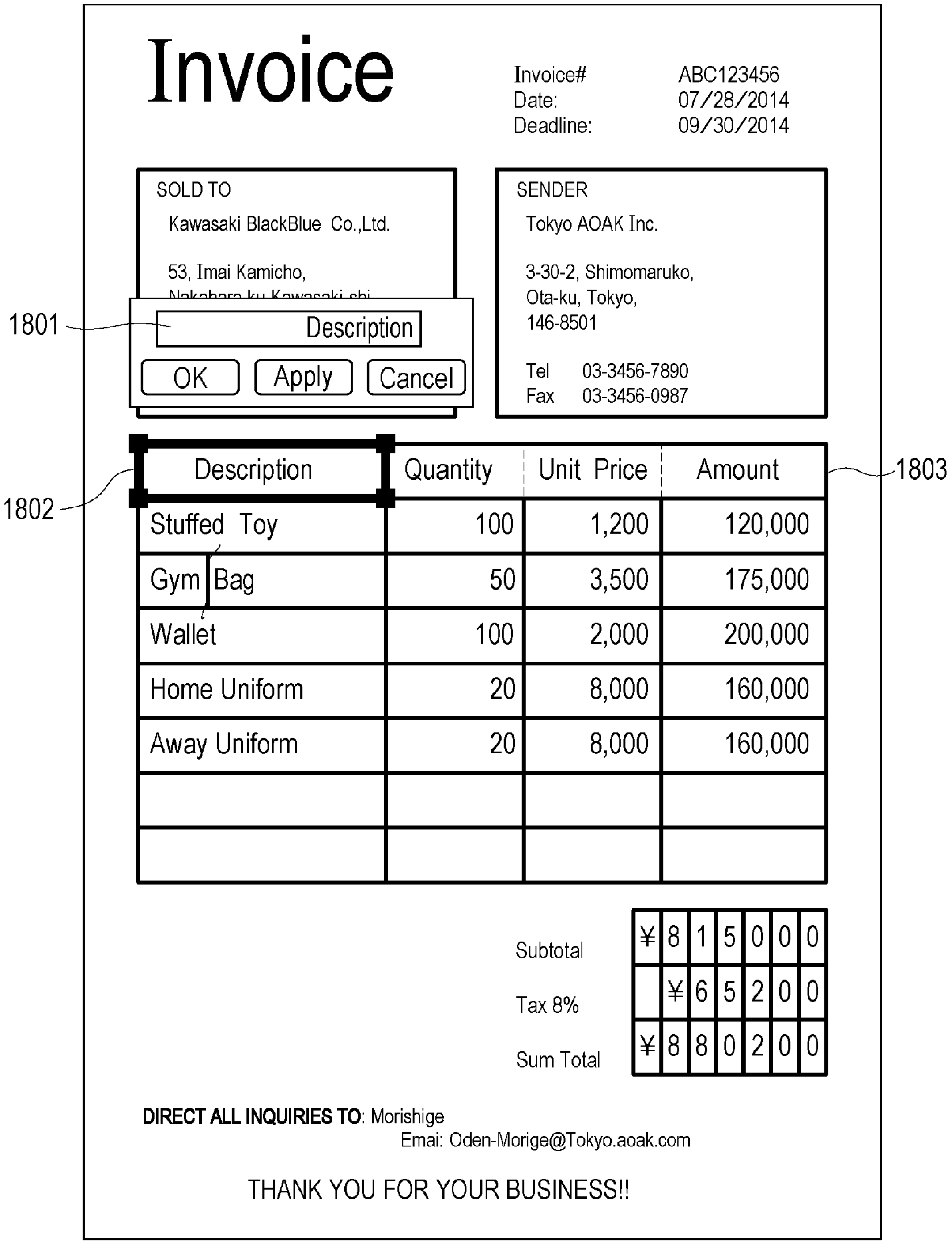

FIG. 18

Invoice

Invoice# ABC123456
Date: 07/28/2014
Deadline: 09/30/2014

SOLD TO
Kawasaki BlackBlue Co.,Ltd.

53, Imai Kamicho,
Nakahara-ku, Kawasaki-shi,

SENDER
Tokyo AOAK Inc.

3-30-2, Shimomaruko,
Ota-ku, Tokyo,
146-8501

Tel  03-3456-7890
Fax  03-3456-0987

1801 — Description
[OK] [Apply] [Cancel]

| Description | Quantity | Unit Price | Amount |
|---|---|---|---|
| Stuffed Toy | 100 | 1,200 | 120,000 |
| Gym Bag | 50 | 3,500 | 175,000 |
| Wallet | 100 | 2,000 | 200,000 |
| Home Uniform | 20 | 8,000 | 160,000 |
| Away Uniform | 20 | 8,000 | 160,000 |
|  |  |  |  |
|  |  |  |  |

1802, 1803

Subtotal ¥ 8 1 5 0 0 0
Tax 8%  ¥ 6 5 2 0 0
Sum Total ¥ 8 8 0 2 0 0

DIRECT ALL INQUIRIES TO: Morishige
Emai: Oden-Morige@Tokyo.aoak.com

THANK YOU FOR YOUR BUSINESS!!

INFORMATION PROCESSING APPARATUS, INFORMATION PROCESSING METHOD, AND STORAGE MEDIUM

BACKGROUND OF THE INVENTION

Field of the Invention

The present invention relates to an information processing apparatus configured to edit a table region in an image.

Description of the Related Art

FIG. 3 illustrates an example of a scanned image. This scanned image may be desired to be edited in some cases. Japanese Patent Laid-Open No. 2001-094760 discloses an editing function of the scanned image.

Specifically, according to Japanese Patent Laid-Open No. 2001-094760, a table region constituted by a plurality of ruled lines is identified from the scanned image, and character recognition of a character inside the table region is further performed. In addition, vectorization of the respective ruled lines constituting the table region is performed.

Subsequently, while the scanned image is displayed on a left window, a vectorization result and a recognized character are displayed on a right window (Japanese Patent Laid-Open No. 2001-094760).

When a user performs character editing on this right window, the above-described identified table region is deleted from the left window. Subsequently, a table to which the character after the editing is added is generated, and the generated table is displayed on the left window.

According to the technology disclosed in Japanese Patent Laid-Open No. 2001-094760, in a case where the identified table region includes the ruled line of the cell, the ruled line of the scanned image is also deleted.

SUMMARY OF THE INVENTION

An information processing apparatus according to an aspect of the present invention includes a detection unit that detects straight lines from regions around four sides that constitute a recognized cell, and a deletion unit that deletes color information of an inside of a region surrounded by the detected four straight lines.

Further features of the present invention will become apparent from the following description of exemplary embodiments with reference to the attached drawings.

BRIEF DESCRIPTION OF THE DRAWINGS

FIG. 3 illustrates an example of a scanned image.

FIG. 4 illustrates a result of a region division of the scanned image.

FIG. 5 illustrates a display screen that displays a frame of a recognized cell.

FIG. 6 illustrates a display screen that is displayed when the recognized cell is selected.

FIG. 7 illustrates a screen that displays a character after an editing.

FIG. 12 illustrates a display screen that is displayed when the recognized cell is selected.

FIG. 13 illustrates a display screen that is displayed when the recognized cell is enlarged.

FIGS. 14A and 14B illustrate a display screen that is displayed after the recognized cells are combined with each other.

FIG. 16 illustrates a display screen that is displayed when the recognized cell is selected.

FIG. 17 illustrates a display screen that is displayed when the recognized cell is reduced.

FIG. 18 illustrates a display screen that is displayed after the recognized cell is divided.

DESCRIPTION OF THE EMBODIMENTS

Figure 1:
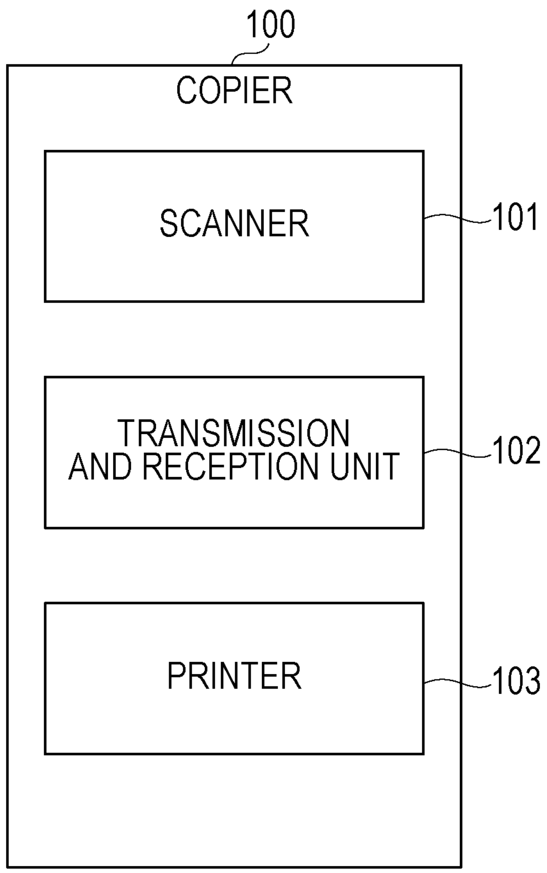
FIG. 1 is a block diagram illustrating a configuration of a copier.

First, terms will be defined.

An original character refers to a character image in a scanned image.

A recognized character refers to a character code obtained by performing a character recognition of the original character or a character corresponding to the character code which is displayed on the editing window. This recognized character is displayed on the editing window at a character size for the editing window (the character size for the editing window means a character size that is set for the editing window).

“Editing of the character” refers to an action for the user to delete the recognized character from the editing window and input a substitute character on the editing window. “Character after the editing” refers to the input substitute character or a character code corresponding to the character. This character after the editing is displayed at the character size for the editing window in a case where the character is displayed on the editing window. This character after the editing is displayed at the character size for the scanned image in a case where the character is displayed on the scanned image.

It is noted that default values of the character size for the scanned image and the character size for the editing window are both saved in a save unit 202 in advance.

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any medium that may store information. Examples of the processor readable or machine accessible medium that may store include a storage medium, an electronic circuit, a semiconductor memory device, a read only memory (ROM), a flash memory, a Universal Serial Bus (USB) memory stick, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

Hereinafter, exemplary embodiments for carrying out the present invention will be described by using the drawings.

First Exemplary Embodiment

Configuration of a Copier and a Configuration of an Information Processing Apparatus FIG. 1 illustrates a configuration of a copier 100 according to the present exemplary embodiment. The copier 100 is constituted by a scanner 101, a transmission and reception unit 102, and a printer 103.

Figure 2:
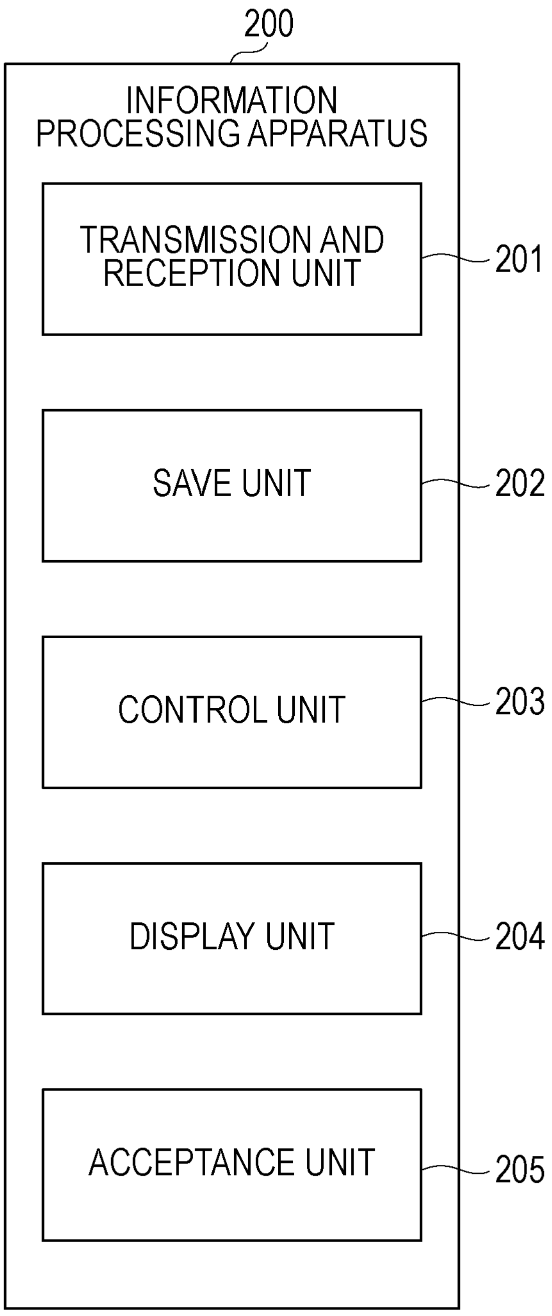
FIG. 2 is a block diagram illustrating a configuration of an information processing apparatus.

FIG. 2 illustrates a configuration of the information processing apparatus 200 according to the present exemplary embodiment. The information processing apparatus 200 includes a CPU, a ROM, and a RAM therein. The CPU loads a program of the information processing apparatus 200 from the ROM and executes the program of the information processing apparatus 200 by using the RAM as a temporary storage space. With the above-described operations, processings of respective units (201 to 205) are executed. It is noted that a mode in which the acceptance unit 205 includes a key board and a mouse is generally adopted but is not limited to this mode. The acceptance unit 205 and the display unit 204 may be integrated with each other. In that case, the acceptance unit 205 and the display unit 204 are collectively referred to as touch panel, and a description "click" in the exemplary embodiments will be construed as "touch".

From Scanning to Region Division, and Character Recognition

A scanner of the copier 100 scans a document, a scanned image (also referred to as scanned image data or document image) is generated. The transmission and reception unit 102 transmits the generated scanned image to the information processing apparatus 200. The transmission and reception unit 201 of the information processing apparatus 200 then receives this scanned image and saves the scanned image in the save unit 202.

The user selects one scanned image via the acceptance unit 205 from among a plurality of scanned images saved in the save unit 202. The control unit 203 then displays the scanned image on the display unit 204.

The user instructs an analysis of the scanned image displayed on the display unit 204 via the acceptance unit 205. The control unit 203 then executes three processings including region division, character recognition, and recognized cell frame display and displays an execution result on the display unit 204. FIG. 3 illustrates an example of the scanned image, and FIG. 4 illustrates a display result of the display unit 204 after the execution of the three processings by the control unit 203. Descriptions of the region division processing (1) to (5), the character recognition processing (6), and the recognized cell frame display processing (7)

(1) Binarization

The control unit 203 performs binarization with respect to the scanned image to obtain a binary image. By this binarization, a pixel having a color darker than a threshold in the scanned image turns to a black pixel, and a pixel having a color darker than the threshold turns to a white pixel. In the following explanation, the descriptions will be given while the scanned image is set to have 100 DPI, but of course, the scanned image is not limited to this resolution.

(2) Black Pixel Block Detection

Figure 23:
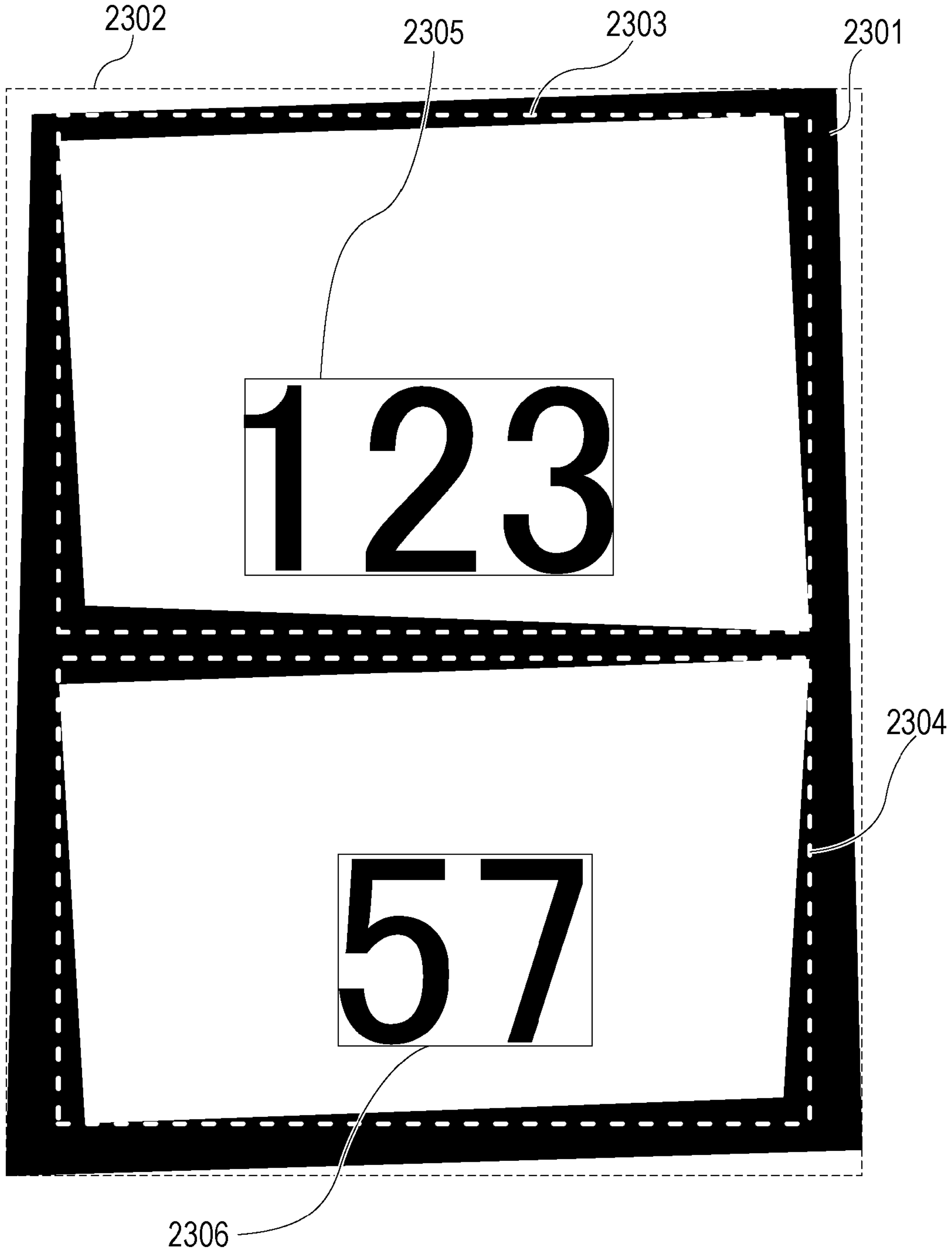
FIG. 23 illustrates detection of the recognized cell.

The control unit 203 traces a contour of black pixels connected by way of eight junctions with respect to the binary image to detect a block of black pixels (black pixel block) continuously existing in any one of eight directions. The eight junctions mean that pixels having a same color (black in this case) are continuous in any one of eight directions including upper left, left, lower left, bottom, lower right, right, upper right, and top. Meanwhile, four junctions mean that pixels having a same color are continuous in any one of four directions including left, bottom, right, and top. In this processing (2), a single black pixel (isolated point) existing where none of adjacent pixels in the eight directions is the black pixel is regarded as noise and is not detected. On the other hand, the black pixel existing where at least one of adjacent pixels in the eight directions is also the black pixel is detected together with the adjacent pixel as the black pixel block. A black pixel block 2301 in FIG. 23 is an example of the black pixel block detected by the control unit 203 from this binary image. The control unit 203 calculates position information of a circumscribed rectangle of the detected black pixel block (which refers to X, Y coordinate information of four apexes). It is noted that the X axis extends in the right direction, and the Y axis extends in the downward direction. A width refers to a length in the X axis direction, and a height refers to a length in the Y axis direction. FIG. 23 also illustrates a circumscribed rectangle 2302 of the black pixel block 2301. It is noted that a representation "rectangular" in the present specification does not include a slanted rectangular and represents a rectangular having all four sides parallel to one of the X coordinate axis and the Y coordinate axis.

(3) Table Region Detection

The control unit 203 determines whether or not the detected black pixel block satisfies all of the following conditions and determines that the black pixel block that satisfies all of the conditions corresponds to the black pixel block constituting the frame of the table.

The width and the height of the circumscribed rectangle of the black pixel block are higher than or equal to a threshold (for example, higher than or equal to 100 pixels . . . 0.25 cm).

The filling rate of the black pixel block inside the circumscribed rectangle is lower than or equal to a threshold (for example, the rate of the black pixel block occupied in circumscribed rectangle is lower than or equal to 20%).

The differences of the maximum width and the height of the black pixel block (that is, the maximum number of black pixels continuous in the X axis direction and the maximum number of black pixels continuous in the Y axis direction) and the width and the height of the circumscribed rectangle are both small (for example, the pixel differences of the maximum width and the height of the black pixel block and the width and the height of the circumscribed rectangle are both smaller than or equal to 10 pixels).

The control unit 203 saves position information of the circumscribed rectangle of the black pixel block determined to constitute the frame of the table in the save unit 202. In the following explanation, the circumscribed rectangle having the thus saved position information is referred to as table region. As a result of the above-described determination, the black pixel block 2301 of FIG. 23 is determined to constitute the frame of the table. According to this, the circumscribed rectangle 2302 is referred to as table region. It is noted that the determination condition for the table region is not limited to the above-described condition. For example, such a condition may be added that a plurality of white pixel blocks are detected by tracing a contour of the while pixels inside the black pixel block, and the circumscribed rectangles of the plurality of white pixel blocks are arranged in a lattice.

(4) Recognized Cell Identification

The control unit 203 identifies a recognized cell inside the table region. To identify the recognized cell, the white pixel block is to be detected by tracing a contour of the white pixels inside the table region. Additionally, in a case where the white pixel block also satisfies predetermined conditions, the circumscribed rectangle of the white pixel block is identified as the recognized cell. In the example of FIG. 23, the control unit 203 detects two white pixel blocks from the inside of the black pixel block 2301 and identifies the circumscribed rectangles of the detected respective white pixel blocks as recognized cells 2303 and 2304. The control unit 203 saves the position information of the identified recognized cell in the save unit 202.

It is noted that, for example, satisfaction of the predetermined conditions refers to satisfaction of all the following three conditions.

The width and the height of the circumscribed rectangle of the white pixel block are higher than or equal to a threshold (for example, 20 pixels).

The filling rate of the black pixel block inside the circumscribed rectangle is lower than or equal to a threshold (for example, the rate of the black pixel block occupied in circumscribed rectangle is lower than or equal to 20%).

The maximum width and the height of the white pixel block and the width and the height of the circumscribed rectangle are both small (for example, the pixel differences of the maximum width and the height of the white pixel block and the width and the height of the circumscribed rectangle are both smaller than or equal to 5 pixels).

(5) Identification of the Character Region in the Recognized Cell

The control unit 203 determines whether or not the black pixel blocks surrounded by the white pixel blocks inscribed to the respective recognized cells exist inside the respective recognized cells. Subsequently, in a case where the black pixel blocks exist, the circumscribed rectangles are set in all the black pixel blocks.

Furthermore, in a case where the control unit 203 sets a plurality of circumscribed rectangles in one recognized cell, it is determined as to whether or not a distance between the mutual circumscribed rectangles is within a predetermined threshold (for example, 20 pixels . . . 0.5 cm). Specifically, the control unit 203 selects the circumscribed rectangle one by one and detects the circumscribed rectangle where a distance from the selected circumscribed rectangle is within the predetermined threshold.

Furthermore, in a case where the control unit 203 detects the circumscribed rectangle where the distance between the mutual circumscribed rectangles is within the predetermined threshold, the detected circumscribed rectangles are integrated with each other. That is, the control unit 203 sets a new rectangle circumscribed to both the circumscribed rectangles and deletes the two circumscribed rectangle before the integration instead.

After the setting of the new circumscribed rectangle and the deletion of the two circumscribed rectangles are completed, the control unit 203 selects the circumscribed rectangle again one by one from the beginning in the recognized cell and integrates the circumscribed rectangles where the mutual distance is within the predetermined threshold with each other. That is, the integration processing for the mutual circumscribed rectangles is repeated until the circumscribed rectangles where the mutual distance is within the predetermined threshold do not exist.

As described above, according to the present exemplary embodiment, the circumscribed rectangles existing inside the single recognized cell are integrated with each other, but the circumscribed rectangles striding across the recognized cells are not integrated with each other.

The circumscribed rectangle (that is, the circumscribed rectangle after the integration) that has been set after the above-described processing is referred to as character region. The above-described processing is referred to as identification of the character region in the recognized cell. The control unit 203 associates the position information of the character region existing inside the recognized cell with this recognized cell to be saved in the save unit 202.

FIG. 23 illustrates character regions 2305 and 2306. The character region 2305 is associated with the recognized cell 2303, and the character region 2306 is associated with the recognized cell 2304 to be saved in the save unit 202.

FIG. 4 illustrates a result of region division performed with respect to the scanned image in FIG. 3. In FIG. 4, the circumscribed rectangle indicating the identified recognized cell is represented by a bold line frame, and the circumscribed rectangle indicating the character region is represented by a dotted line frame. In the example of FIG. 4, bold line frames 402, 403, 404, 406, 407, and the like represent recognized cells. Dotted line frame 401, 405, and the like represent character regions.

In FIG. 4, since a ruled line inside the bold line frame 403 is faded, the bold line frame 403, which is originally constituted by a plurality of cells, is identified as a single recognized cell. The bold line frames 406 and 407, which are originally a single cell, are identified as separate recognized cells.

(6) Character Recognition

The control unit 203 performs the character recognition processing with respect to the respective character regions to obtain the recognized characters corresponding to the respective character regions. The recognized characters are saved in the save unit 202 while being associated with the corresponding character regions. As a result, the recognized character is also associated with the recognized cell that has been previously associated with the character region. In a case where the character recognition is not performed or a case where the character recognition fails, the recognized character associated with the character region does not exist.

The information saved in the save unit 202 by the processings from (1) to (6) are as follows in FIG. 23. The character region 2305 and the recognized character "123" are associated with the recognized cell 2303, and the character region 2306 and the recognized character "57" are associated with the recognized cell 2304 to be saved in the save unit 202.

(7) Recognized Cell Frame Display

Four sides of the respective recognized cells (that is, four sides of the circumscribed rectangle of the white pixel block) are represented by bold line frames by the control unit 203, and the scanned image is displayed on the display unit 204. FIG. 5 illustrates a displayed screen. It is noted that a mode of the frame may be a mode other than the bold line or the solid line, and a color of the frame may be a color other than black of course, but the descriptions will continue hereinafter while the frame is set as the bold line. The scanned image displayed together with the bold line frame in this processing (7) is the scanned image before the processings (1) to (6) are performed, that is, the scanned image before the binarization.

Figure 8:
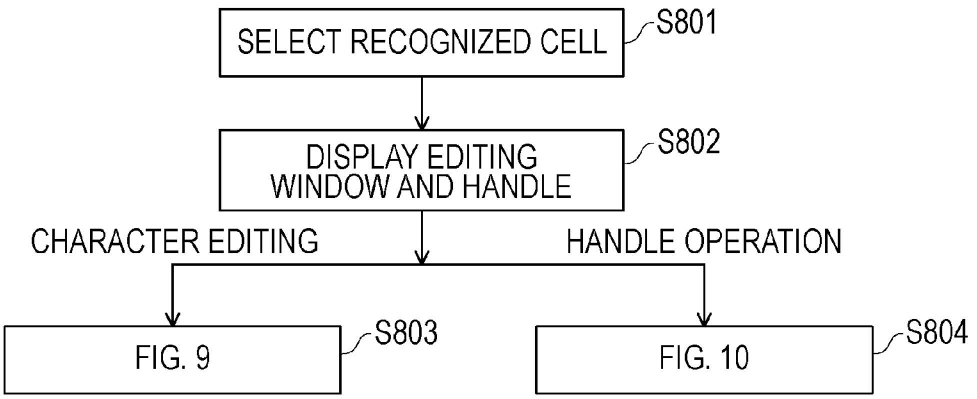
FIG. 8 is a main flow chart.

Description of FIG. 8

The user clicks an arbitrary part of the screen displayed on the display unit 204 in FIG. 5 via the acceptance unit 205. It is noted that the click in the present specification refers to an action in which a left button of the mouse is pressed and immediately released (within a certain period of time after the press). In a case where the clicked part is on an inner side of the circumscribed rectangle of the recognized cell, the control unit 203 determines that the recognized cell is selected (S801). FIG. 6 illustrates a display screen that is displayed when a recognized cell 602 is selected. Herein, the descriptions will continue below while it is assumed that the recognized cell 602 is selected. It is noted that a mouse pointer 601 indicates a position indicated by the user via the acceptance unit 205.

When the above-described determination is performed, the control unit 203 additionally displays an editing window 604 for editing the original character inside the selected recognized cell and a handle 603 for changing a position and a size of the selected recognized cell 602 on the display unit 204 (S802). The handle 603 (referred to as recognized cell position changing handle) is additionally displayed at four apexes of the bold line frame of the selected recognized cell 602. FIG. 6 illustrates a result after the recognized cell position changing handle 603 and the editing window 604 are additionally displayed.

In addition, in S802, like FIG. 6, the selected recognized cell (the recognized cell in the selected state) may be distinguished from the other recognized cells. For example, the frame of the recognized cell in the selected state may be thickened more (a very thick line frame may be adopted). Of course, other methods may be adopted as long as the recognized cell can be distinguished from the other recognized cells. For example, a method of changing the color of the frame of the recognized cell in the selected state or a method of using a dotted line may also be conceivable. It is however noted that, in the present specification, the descriptions will continue below while the example in which the method of using the very thick line frame to distinguish the selected recognized cell from the other recognized cells is adopted.

In a case where the selected state of the recognized cell is cancelled, the state is returned from the above-described very thick line frame state to the original state (that is, the state is returned to the same bold line frame state as the other recognized cells).

The recognized character associated with the selected recognized cell is displayed in a character input column 605 on the editing window 604 at the character size for the editing window (the detailed processing of the display will be described in FIG. 24). The user deletes the recognized character from the character input column 605 and can instead input other characters. With this configuration, the recognized character can be edited (the detailed processing of the editing will be described in FIG. 9). It is noted that in a case where the recognized character associated with the selected recognized cell does not exist (for example, the character region is not detected from the inside of the selected recognized cell, or the recognized character does not exist since the character recognition fails although the character region is detected), the character input column 605 is empty.

An OK button 606 is a button to be clicked in a case where the character editing is wished to be confirmed. An Apply button 607 is a button to be clicked in a case where the character after the editing is wished to be displayed on the scanned image. A Cancel button 608 is a button to be clicked in a case where the character editing is wished to be cancelled.

After the screen of FIG. 6 is displayed, the user performs a new operation on the acceptance unit 205. If the operation is character editing on the editing window 604, the control unit 203 advances the flow to the processing in S803 (S901 in FIG. 9). If the user the operation performed on the acceptance unit 205 is operation performed on the recognized cell position changing handle, the control unit 203 advances the flow to the processing in S804 (S1001 in FIG. 10).

Figure 9:
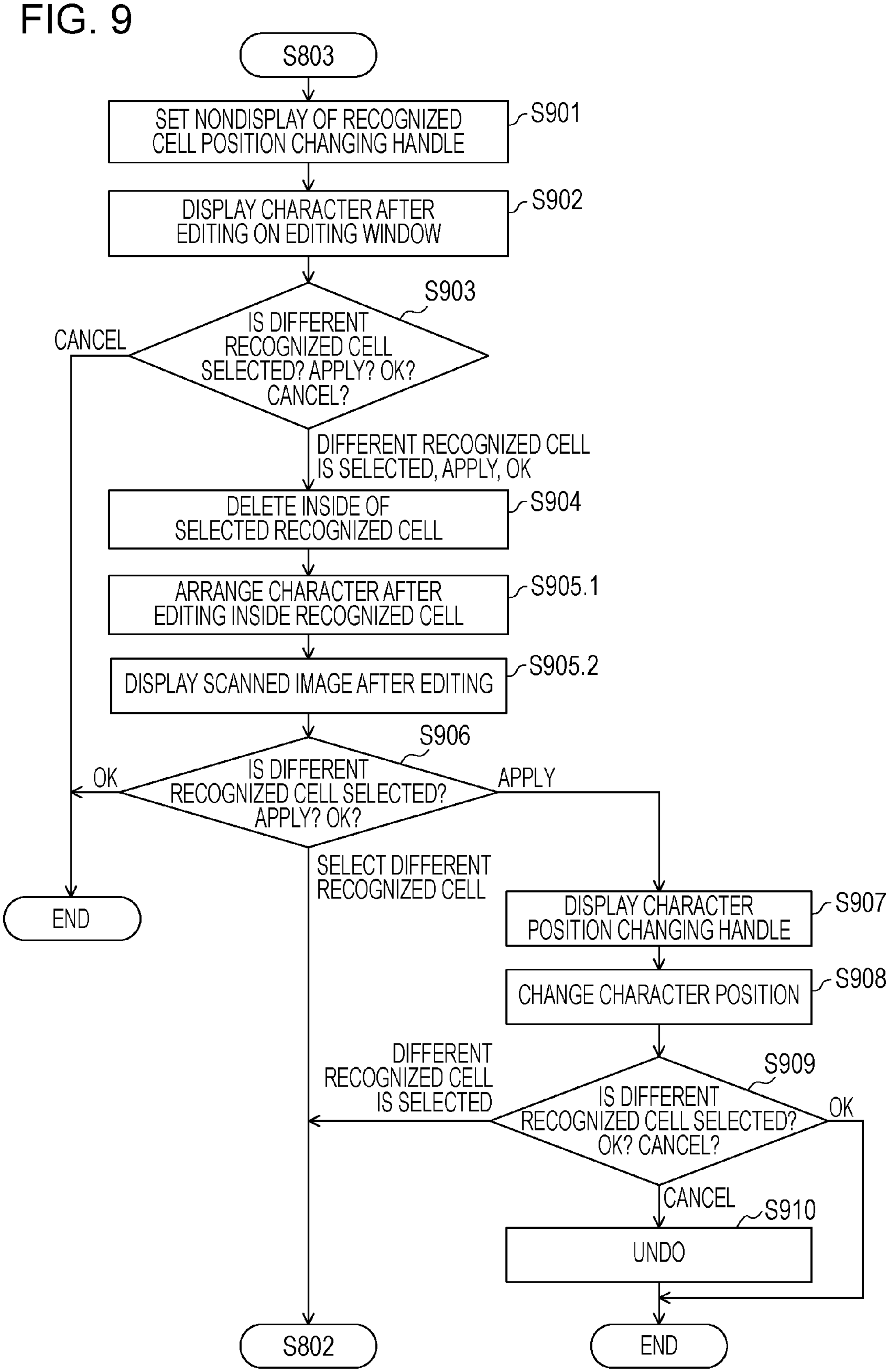
FIG. 9 is a flow chart for the editing.

Description of FIG. 9

In S901, the control unit 203 sets nondisplay of the recognized cell position changing handle 603.

In S902, the control unit 203 displays the character edited on the editing window 604 on the editing window 604 at the character size for the editing window.

In S903, the control unit 203 determines whether the operation performed by the user with respect to the acceptance unit 205 after the character editing is the selection of the other recognized cell, the click of the Apply button, the click of the OK button, or the click of the Cancel button. When it is determined that the operation is the click of the Cancel button, the control unit 203 cancels the selected state of the selected recognized cell and then ends the processing of FIG. 9. It is noted that the descriptions will be omitted thereafter, the recognized cell cancelled from the selected state returns, as described above, from the very thick line frame state to the same bold line frame state as the other recognized cells.

When it is determined that the other case applies, the control unit 203 deletes all the colors inside the selected recognized cell (that is, the inner part of the recognized cell in the scanned image) (S904). Herein, the color deletion means that color information of pixels in the recognized cell is substituted with default color information. According to the present exemplary embodiment, the descriptions will continue while the default color information is set as white, but the default color is not limited to white. For example, the color information may be substituted with a background color of the recognized cell. The specific processing in this S904 will be described below by using FIGS. 20 to 22. It is noted that the character image in this selected recognized cell is also deleted by the color substitution processing in this recognized cell.

Furthermore, the control unit 203 arranges the character after the editing in the recognized cell at the character size for the scanned image (S905.1. A detail of which will be described in FIG. 11). Subsequently, the control unit 203 saves the scanned image after the editing (that is, the image in which the deletion of the inside of the recognized cell and the arrangement of the character after the editing are completed) in the save unit 202 and also substitutes the scanned image displayed on the display unit 204 with this scanned image after the editing (S905.2). With this configuration, this scanned image after the editing is displayed in a state where the circumscribed rectangles of the respective recognized cells are represented by the bold line frames. In addition, the circumscribed rectangle of the currently selected recognized cell remains to be displayed in the very thick line frame state.

Furthermore, when it is determined that the above-described operation is the click of the OK button (S906), the control unit 203 cancels the selected state of the selected recognized cell and then ends the processing of FIG. 9. When the above-described operation is the selection of the other recognized cell (S906), the control unit 203 cancels the selected state of the selected recognized cell and then advances the flow to the processing in S802. When the above-described operation is the click of the Apply button 607 (S906), the control unit 203 displays the character position changing handle at the four apexes of the circumscribed rectangle of the character after the editing which is arranged in S905.1 (S907).

If the user wishes to change the position of the character after the editing, the user performs the operation for moving the position of this character position changing handle with respect to the acceptance unit 205. The control unit 203 then performs the character position change in accordance with the operation, and moreover, the image after the character position change is substituted with the scanned image after the editing which is saved in the save unit 202. Furthermore, the image after the character position change is also substituted with the scanned image after the editing which is currently displayed. With this configuration, the image after the character position change is saved as the scanned image after the editing and displayed (S908). On the other hand, in a case where the character position does not need to be changed, the operation with respect to the character position changing handle is not performed. In that case, no processing is performed in S908 to be skipped.

Thereafter, the user selects the different recognized cell, clicks the OK button, or clicks the Cancel button. If the acceptance unit 205 accepts that the different recognized cell is selected (S909), the control unit 203 cancels the selected state of the selected recognized cell and then advances the flow to the processing in S802. If the acceptance unit 205 accepts that the OK button is clicked (S909), the control unit 203 cancels the selected state of the selected recognized cell and ends the processing of FIG. 9. If the acceptance unit 205 accepts that the Cancel button is clicked (S909), the control unit 203 returns the inside of the selected recognized cell to the original state (that is, returns to the state before the deletion processing in S904). After that, the control unit 203 cancels the selected state of the selected recognized cell and ends the processing of FIG. 9 (S910).

After the processing of FIG. 9 is ended, a state of standing by for the selection of the other recognized cell from the user is established. In a case where the user instructs the transmission of the scanned image after the editing to the other apparatus with respect to the acceptance unit 205, the control unit 203 cancels the selection standby state. Thereafter, the control unit 203 causes the transmission and reception unit 201 to transmit the scanned image after the editing which is saved in the save unit 202 to the other apparatus. If the other apparatus is the copier 100, the copier 100 receives the scanned image after the editing by the transmission and reception unit 102 and prints the scanned image after the editing by the printer 103 depending on the instruction from the user.

In a case where the above-described processing is performed, the scanned image after the editing which is transmitted to the other apparatus is the image in which the deletion of the inside of the (selected) recognized cell and the arrangement of the character after the editing are completed. However, the transmitted image is not necessarily limited to this. For example, a file including the original scanned image (the scanned image before the binarization), the deletion command for the inside of the recognized cell, and the arrangement command for the character after the editing may be transmitted. In a case where the other apparatus receives the above-described file, the deletion of the inside of the recognized cell from the original scanned image and the arrangement of the character after the editing are performed on the other apparatus side.

Figure 10:
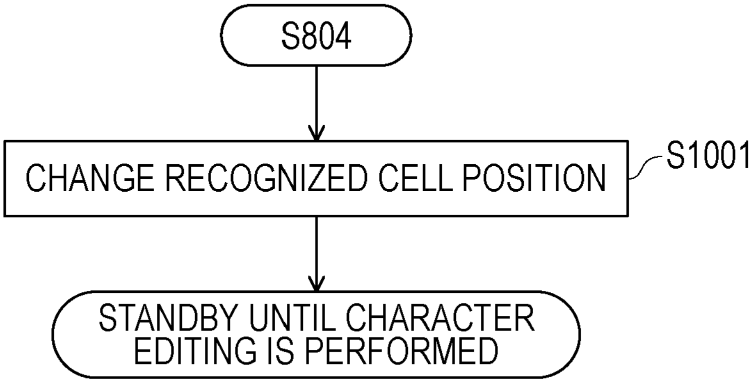
FIG. 10 is a flow chart for changing a position of the recognized cell.

Description of FIG. 10

As described above, if the operation performed by the user with respect to the acceptance unit 205 is the operation performed with respect to the recognized cell position changing handle 603, the control unit 203 advances the flow to the processing in S804 (S1001 in FIG. 10).

In S1001, the control unit 203 changes the position of the recognized cell in accordance with the operation and puts the four sides of the recognized cell at the position after the change into the very thick line frame state to be displayed on the display unit 204. At this time, the very thick line frame state of the four sides of the recognized cell at the position before the change is cancelled, and the state returns to a normal state (state in which the bold line frame or the very thick line frame are not illustrated). The recognized cell position changing handle 603 is also similarly cancelled from the four apexes of the recognized cell at the position before the change and is displayed at the four apexes of the recognized cell at the position after the change. It is noted that the change in the position of the recognized cell means that the position information of the recognized cell which is saved in the save unit 202 is changed.

Thereafter, the control unit 203 stands by until the character editing via the editing window 604 is performed, and when the character editing is performed, the control unit 203 advances the flow to the processing in S901.

In this manner, since the position of the recognized cell is set to be changeable before the character editing is performed, it is possible to change the position of the recognized cell corresponding to the target where the inside is to be deleted in S904. Accordingly, the part meant to be deleted is deleted, and also the part that is not meant to be deleted is not deleted.

Figure 11:
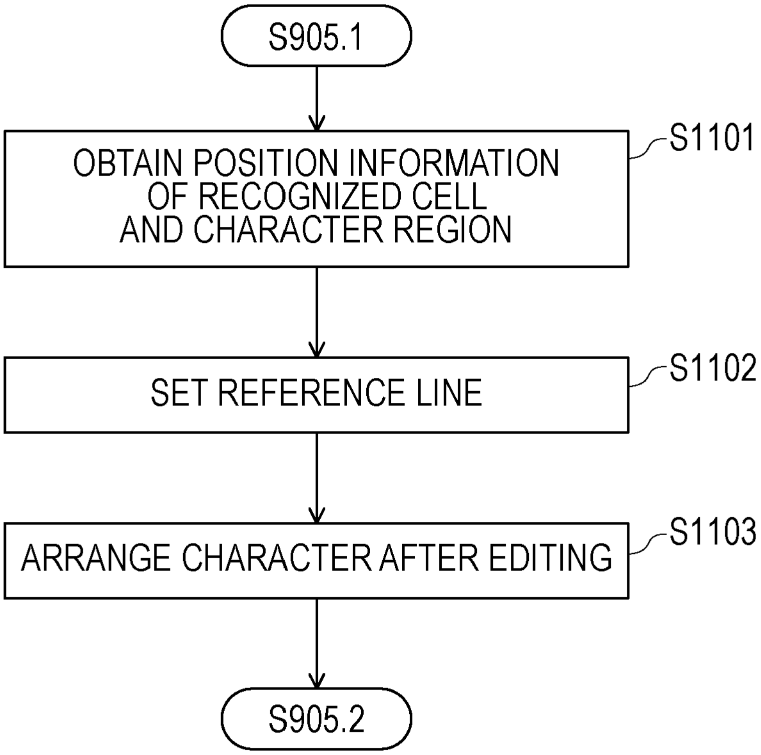
FIG. 11 is a display flow for the character after the editing.

Description of FIG. 11

The detail of the processing in S905.1 will be described by using FIG. 11.

In S1101, the control unit 203 obtains the position information of the selected recognized cell and the position information of the character region associated with this recognized cell from the save unit 202.

Next, in S1102, the control unit 203 performs a setting of a reference line.

The upper left coordinates of the recognized cell is set as (X1, Y1), the lower right coordinates is set as (X2, Y2), the upper left coordinates of the character region is set as (X1, Y1), and the lower right coordinates is set as (X2, Y2).

To perform the setting of the reference line, first, the control unit 203 calculates margins on the left-hand side and the right-hand side of the character region in the selected recognized cell.

Margin on the left-hand side: x1-X1

Margin on the right-hand side: X2-x2

When (the margin on the left-hand side)≥(the margin on the right-hand side) is established, the reference line is set as the right side of the character region, that is, the straight line connecting (X2, Y2) and (X2, Y2) to each other.

When (the margin on the left-hand side)<(the margin on the right-hand side) is established, the reference line is set as the left side of the character region, that is, the straight line connecting (X1, Y1) and (x1, y2) to each other.

In S1103, the control unit 203 arranges the character after the editing in accordance with the reference line that is set inside the selected recognized cell.

At this time, a default value of the character size for the scanned image is used as a size of the arranged character, but a size determined in the following manner may be used. For example, in a case where the width of the original character existing inside the selected recognized cell is 4 characters and 100 dots, the size per character is estimated to be 25 dots. To arrange the characters after the editing inside this recognized cell without a sense of discomfort, the characters after the editing may have approximately 25 dots per character. According to this, a point number is calculated such that a size of the standard character corresponds to 25 dots, and the point number can also be used as the size of the arranged character. A configuration in which the thus set character size can be manually changed by the user may also be adopted. Furthermore, a configuration in which a color, a font, and a style (standard, italic, or bold) of the arranged character can be manually changed by the user may also be adopted.

Herein, the height and the width of the circumscribed rectangle of the character after the editing are respectively set as H and W. In addition, it is assumed that the upper left coordinates of the character region are (X1, Y1), the lower right coordinates are (X2, Y2), and the reference line obtained in S1102 is the right side of the character region.

In this case, the coordinates where the circumscribed rectangle of the character after the editing is arranged in the case of Microsoft Windows (wherein the x coordinate is increased as the coordinate moves towards the right side, and the y coordinate is increased as the coordinate moves towards the lower side) are as follows.

Upper left coordinates: (x2−W, y2−H)

Lower right coordinates: (X2, Y2)

If the reference line is the left side, to match the left side of the circumscribed rectangle of the character after the editing with the reference line (the left side of the character region), coordinates where the character after the editing is arranged are as follows.

Upper left coordinates: (x1, y2−H)

Lower right coordinates: (x1+aW, y2)

It is noted that, in these examples, the position of the character after the editing in the height direction (Y direction) uses the position of the lower side of the character region where the original character is arranged as the reference. However, instead of this position, the position of the character after the editing may be determined such that the center of the character after the editing in the height direction is matched with the center of the character region where the original character is arranged in the height direction.

Detail of S1001 (Recognized Cell Combination and Division)

Figure 15:
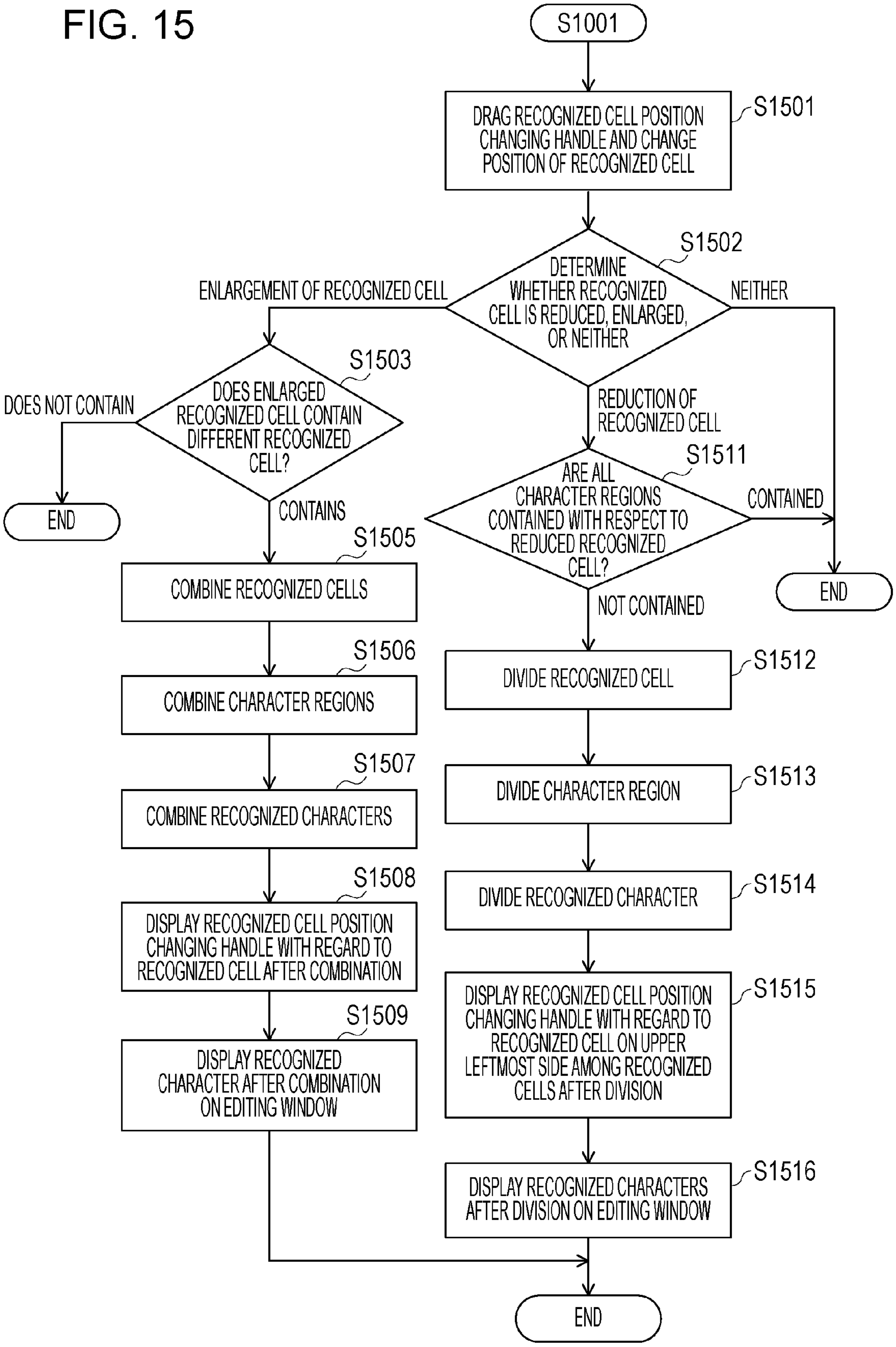
FIG. 15 is a flow chart for combining and dividing the recognized cell.

In FIG. 4, although the recognized cell 406 and the recognized cell 407 are originally a single cell, the recognized cell 406 and the recognized cell 407 are identified as separate recognized cells because of noise. Processing of combining the recognized cell 406 with the recognized cell 407 to be set as the single recognized cell will be described by using FIG. 15. It is noted that FIG. 15 illustrates a detail of the processing for changing the recognized cell position in S1001 in FIG. 10.

First, the user drags the recognized cell position changing handle via the acceptance unit 205 and changes the position of the currently selected recognized cell (S1501).

In S1502, the control unit 203 determines whether the changed position corresponds to a reduction of the currently selected recognized cell, an enlargement, or neither. A specific determination method will be described below. The width and the height of the recognized cell before the position is changed are respectively set as W1 and H1, and the width and the height of the recognized cell after the position is changed are respectively set as W2 and H2. In a case where W1<W2 and also H1<H2 are established, the control unit 203 determines that the recognized cell is enlarged. In a case where W1>W2 and also H1>H2 are established, the control unit 203 determines that the recognized cell is reduced. In the other cases, the control unit 203 determines that neither has occurred.

In a case where the control unit 203 determines that neither has occurred, the control unit 203 ends the processing.

In a case where the control unit 203 determines that the recognized cell is enlarged, the control unit 203 determines whether or not the recognized cell after the enlargement includes a different recognized cell (S1503). When it is determined that the recognized cell after the enlargement does not include the different recognized cell, the control unit 203 does not perform the combination of the recognized cells and ends the processing.

On the other hand, it is determined in S1503 that the recognized cell after the enlargement includes the different recognized cell, the control unit 203 combines the recognized cell after the enlargement with the included different recognized cell (S1505).

In the step for the combination of the recognized cells (S1505), the control unit 203 sets a smallest rectangular including both the recognized cells as the recognized cell after the combination on the basis of the coordinates of each of the recognized cells before the combination. Subsequently, the position information of the set recognized cell after the combination is saved in the save unit 202. For example, the upper left coordinates of the two recognized cells to be combined with each other are respectively set as (Xa, Ya) and (Xb, Yb), and if Xa>Xb and Ya<Yb are established, the upper left coordinates of the recognized cell after the combination becomes (Xb, Ya). Lower left, upper right, and lower right coordinates are determined by way of the similar concept. The same also applies in a case where the number of recognized cells to be combined with each other is three or more. It is noted that the position information of the recognized cell after the combination is saved while being associated with the position information of the plurality of recognized cells before the combination (i.e. the position information of the recognized cell after the combination is associated with the position information of the recognized cell before the position changing handle is operated and the position information of the included different recognized cell). After the combination processing for the recognized cells, the recognized cell after the combination is operated similarly as in a normal recognized cell where the combination is not performed. The position information of the recognized cells before the combination is used when the inside of the recognized cell is deleted in S904.

Next, the control unit 203 combines the character regions included in each of the recognized cells with each other (S1506).

Specifically, the control unit 203 detects the character regions included in the recognized cell after the combination. The detected character regions correspond to the character region included in the recognized cell before the enlargement and the character region included in the above-described different recognized cell. Subsequently, the detected character regions are combined with each other. The character region after the combination corresponds to a smallest rectangular that includes all the character regions before the combination. The position information of this smallest rectangular is associated with the recognized cell after the combination as the position information of the character region after the combination and saved in the save unit 202. Subsequently, instead, the position information of the character region included in the recognized cell before the enlargement and the position information of the character region included in the above-described different recognized cell are deleted from the save unit 202.

Next, the control unit 203 combines the recognized characters with each other (S1507). Specifically, the control unit 203 combines the plurality of recognized characters included in the character region after the combination with each other to newly create the single recognized character. Instead, the plurality of original recognized characters are deleted. The newly created recognized character is associated with the character region after the combination by the control unit 203. It is noted that, in the combination of the recognized characters, the plurality of recognized characters may be simply connected to each other, or a space may be inserted between the recognized characters.

Next, the control unit 203 deletes the recognized cell position changing handle from the four apexes of the recognized cells before the combination and displays the recognized cell position changing handle on the display unit 204 at the four apexes of the recognized cell after the combination (S1508). That is, the recognized cell after the combination is put into the selected state.

The control unit 203 also displays the recognized character after the combination in the character input column 605 on the editing window 604 (S1509).

Specific examples of the combination processing for the recognized cells will be described by using FIG. 12, FIG. 13, and FIGS. 14A and 14B.

FIG. 12 illustrates a display screen when the user selects the recognized cell 406 from among the recognized cell 406 and the recognized cell 407 that are identified as the separate recognized cells because of the noise. Since the recognized cell 406 and the recognized cell 407 are identified as the separate recognized cells, "Gym" is displayed on character input column 1201 as the recognized character instead of "Gym Bag".

In a case where the recognized cell 406 and the recognized cell 407 are desired to be combined with each other, first, the user drags the recognized cell position changing handle 603 of the recognized cell 406 to be enlarged so as to include the entire recognized cell 407 (FIG. 13). It is noted that, when the recognized cell is dragged and enlarged, the display of the frame of the recognized cell may be changed such that it can be understood that the recognized cell is being enlarged. For example, the frame of the recognized cell is displayed with a dotted line as denoted by 1301 while the recognized cell is being enlarged.

When the user completes the drag of the recognized cell position changing handle 603, the control unit 203 combines the recognized cell 406 with the recognized cell 407 to display a recognized cell 1401 after the combination on the display unit 204 (FIG. 14A). In addition, the combination of the character regions is also performed. Subsequently, in S1507, the combination of the recognized character is performed, and the recognized character "Gym Bag" after the combination is displayed in a character input column 1402 as the recognized character.

In a case where the recognized cells identified as the separate recognized cells because of the noise are combined with each other as denoted by 1401, the inside of the recognized cell after the combination is deleted for the deletion of the inside of the recognized cell in S904.

A recognized cell 1404 is obtained after recognized cells identified as six separate recognized cells (six cells in which the recognized characters are "¥", "8", "1", "5", "0", and "0") are combined with one another into a single recognized cell.

The six recognized cells are identified as separate recognized cells because of ruled lines for delimiting digits of the number. In this case, the combination of the recognized cells is performed to facilitate the editing of the recognized character. Since the ruled lines have the meaning of "delimiting the digits of the number", the ruled lines for delimiting the digits are maintained even when the deletion of the inside of the recognized cell in S904. When the inside of the recognized cell after the combination is deleted for the inside of the recognized cell in S904, the ruled lines for delimiting the digits are also deleted. In this case, to maintain the ruled lines for delimiting the digits, the inside of the recognized cells before the combination may be deleted.

In this manner, a case where the inside of the recognized cell after the combination may be deleted and a case where the inside of the recognized cells before the combination is deleted exist. To cope with these two cases, in a case where the combination of the recognized cells is performed, a user interface (UI) for allowing the user to select one of "delete the inside of the recognized cell after the combination" and "delete the inside of the recognized cells before the combination" is displayed on the editing window. With a radio button 1403, when one is in the selected state, the other is in the unselected state. For an initial state, "delete the inside of the recognized cell after the combination" is in the selected state. Information as to whether "delete the inside of the recognized cell after the combination" or "delete the inside of the recognized cells before the combination" is selected is obtained when the inside of the recognized cell is deleted in S904.

Next, the division of the recognized cell will be described.

In FIG. 16, the recognized cells 403 are originally to be four recognized cells including the recognized characters "Description", "Quantity", "Unit Price", and "Amount". However, the ruled line of the scanned image is faded, and the recognized cells are identified as a single recognized cell. Processing of dividing the recognized cell 403 into a plurality of recognized cells will be described by using S1511 to S1516.

In S1502, in a case where the control unit 203 determines that the recognized cell is reduced, next, the control unit 203 determines whether or not all the character regions included in the currently selected recognized cell are also included in the recognized cell after the reduction (S1511). When it is determined that all the character regions are included, the control unit 203 does not perform the division of the currently selected recognized cell and ends the processing.

On the other hand, in S1511, in a case where the control unit 203 determines that the character region that is not included in the recognized cell after the reduction exists, the control unit 203 divides the recognized cell before the reduction (S1512). That is, in a case where a part or entirety of the character region included in the recognized cell before the reduction is not included in the recognized cell after the reduction, the recognized cell before the reduction is divided. The division of the recognized cell before the reduction specifically means that the control unit 203 newly creates a recognized cell separately in addition to the recognized cell after the reduction.

The position information of the recognized cell after the reduction and the position information of the above-described newly created recognized cell are determined by the control unit 203 on the basis of the position information of the recognized cell after the reduction and the position information of the recognized cell before the reduction. For example, the recognized cell before the reduction has the upper left coordinates (Xa1, Ya1) and the lower right coordinates (Xa2, Ya2). The user drags the recognized cell position changing handle at the lower right and reduces the recognized cell in the left direction, and it is assumed that the lower right coordinates become (Xa2−W, Ya2) as a result (W denotes a reduced width). In this case, the control unit 203 determines that the recognized cell before the reduction is divided at a position at "the X coordinate=Xa2−W". As a result of the division, coordinates of the recognized cell after the reduction include the upper left coordinates (Xa1, Ya1) and the lower right coordinates (Xa2−W, Ya2), and coordinates of the newly created recognized cell include the upper left coordinates (Xa2−W, Ya1) and the lower right coordinates (Xa2, Ya2).

Next, the control unit 203 performs the division of the character region (S1513). Specifically, first, the association of the character region that is not included in the recognized cell after the reduction with the recognized cell after the reduction is cancelled, and instead, the character region is newly associated with the newly created recognized cell. In a case where the character region is overlapped onto the position where the recognized cell is divided, the character region is also divided at the position where the division is performed. For example, the character region having the upper left coordinates (Xa3, Ya3) and the lower right coordinates (Xa4, Ya4) is divided at a position where the X coordinate is Xa5. In this case, the two character regions including the character region having the upper left coordinates (Xa3, Ya3) and the lower right coordinates (Xa5, Ya4) and the character region having the upper left coordinates (Xa5, Ya4) and the lower right coordinates (Xa4, Ya4) are created. Subsequently, the original character region is deleted by the control unit 203. Thereafter, the control unit 203 respectively associates the newly created two character regions with the recognized cells including the character regions.

Next, the control unit 203 performs division of the recognized character (S1513). The recognized character is divided so as to be included in the divided character regions and associated with the respective character regions.

Next, the control unit 203 displays the recognized cell position changing handle on the display unit 204 with respect to the four apexes of the recognized cell on the upper leftmost side among the recognized cells after the division (S1515). That is, the recognized cell located on the upper leftmost side among the recognized cells generated after the division is put into the selected state. The control unit 203 also displays the recognized characters after the division in the character input column 605 on the editing window 604 (S1516).

With regard to the above-described division processing for the recognized cell, specific examples will be described by using FIG. 16, FIG. 17, and FIG. 18. FIG. 16 illustrates a display screen in a state in which the recognized cell 403 is selected. The recognized cell 403 is originally to be a plurality of recognized cells but is identified as a single recognized cell since the ruled line of the scanned image is faded. All the recognized characters in the recognized cell 403 are displayed while being all combined with each other in a character input column 1601 since the recognized cell is identified as a single recognized cell.

In a case where the recognized cell 403 is desired to be divided, first, the user drags the recognized cell position changing handle 603 at the recognized cell 403 and reduces the recognized cell to a position where the recognized cell is desired to be divided (FIG. 15).

In FIG. 17, only the character region for the recognized character "Description" is included in the recognized cell after the reduction, and "Quantity", "Unit Price", and "Amount" are not included. For that reason, in S1903, the control unit 203 determines that the character region that is not included in the recognized cell after the reduction exists and performs the division of the recognized cell.

After the division of the recognized cell, the control unit 203 puts the recognized cell located on the upper leftmost side among each of the divided recognized cells into the selected state (FIG. 18). The control unit 203 also displays the recognized character "Description" included in the recognized cells after the division in a character input column 1802.

Figure 24:
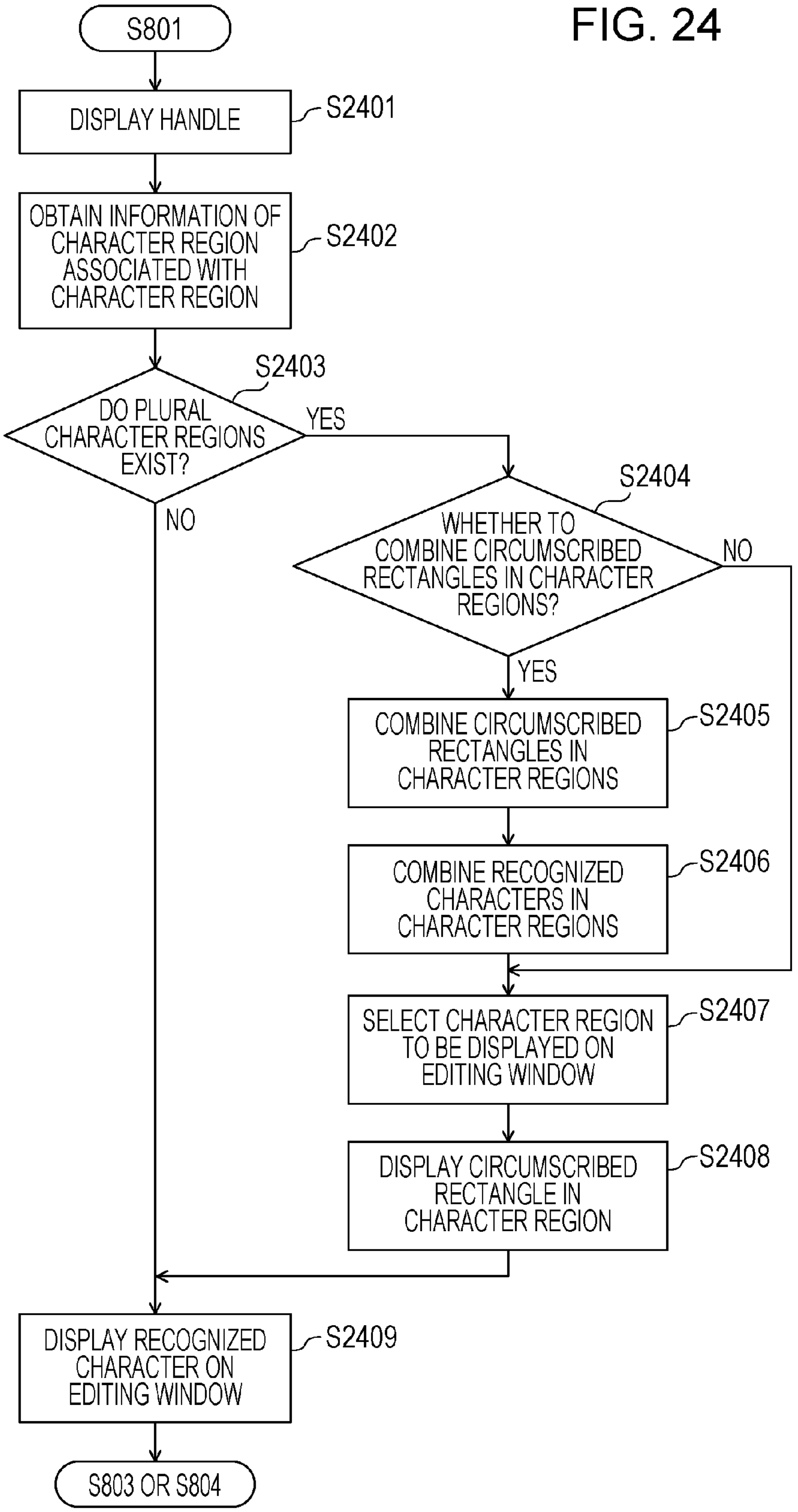
FIG. 24 is a flow chart for selecting a recognized character to be displayed on the editing window.

S802 in FIG. 24: Selection of the Recognized Character to be Displayed on the Editing Window Selection processing for the recognized character to be displayed on the editing window in S802 which is performed by the control unit 203 will be described in detail by using a flow of FIG. 24.

As a result of the character region detection of the region analysis, a plurality of character regions may exist in a single recognized cell in some cases. When all the recognized characters associated with the recognized cell are displayed on the editing window as in a case of 401 and 402 in FIG. 4, usability of the user may be degraded in some cases.

Therefore, the recognized character displayed on the editing window is to be selected depending on a positional relationship of the character regions in the recognized cell.

Figure 25A:
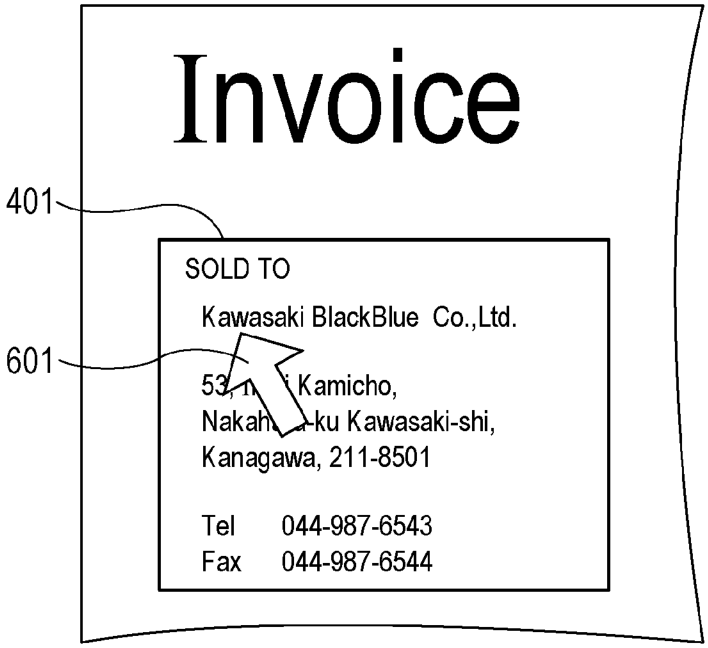
FIGS. 25A and 25B illustrate a display screen displayed after processing of selecting the recognized character is performed.
Figure 25B:
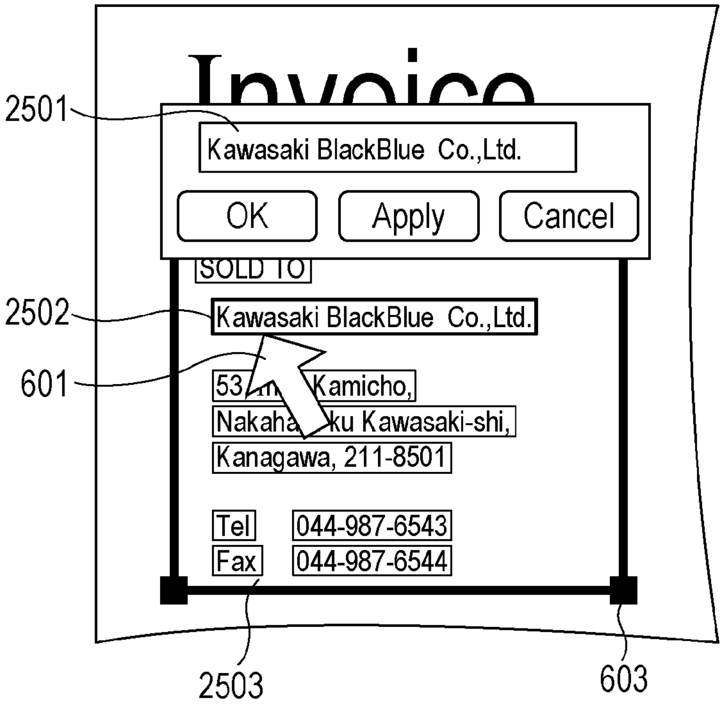

FIG. 25A illustrates a part of FIG. 5 corresponding to the display screen for displaying the frame of the recognized cell. When the mouse pointer 601 is located at the position of FIG. 25A, processing executed by the control unit 203 when the user clicks, that is, the detail of S802 will be described in FIGS. 25A and 25B. FIG. 25B illustrates a state of the display unit 204 after the execution of the processing in S802.

The control unit 203 displays the recognized cell position changing handle (S2401). FIG. 25B is equivalent to the recognized cell position changing handle 603.

Next, the control unit 203 obtains the position information of the character region associated with the recognized cell from the save unit 202 (S2402). At this time, when the number of the obtained character regions is 1 (NO in S2403), the recognized character of the character region is displayed on the editing window as it is (S2409). When the number of the obtained character regions is 2 or more (YES in S2403), a determination is made as to which character region and the recognized character thereof are displayed (S2404 to S2407).

First, the control unit 203 determines whether or not the circumscribed rectangles of the character region are integrated with each other on the basis of the position information of the circumscribed rectangles of the character region (S2404).

While the upper right coordinates and the lower left coordinates of a circumscribed rectangle A in the character region of the comparison target are respectively set as (L_a, T_a) and (R_a, B_a), and the upper right coordinates and the lower left coordinates of a circumscribed rectangle B are respectively set as (L_b, T_b) and (R_b, B_b), integration determination conditions are as follows.

In a case where the two circumscribed rectangles A and B are not overlapped with each other in a horizontal direction corresponding to a row direction, that is, in the case of B_a<T_b, the combination is not performed.

Otherwise (B_a>T_b), in a case where the two circumscribed rectangles are sufficiently apart from each other, that is, in a case where L_b−R_a is higher than or equal to a threshold (for example, 20 pixels . . . 1 cm), the combination is not performed.

Next, the control unit 203 combines the circumscribed rectangles in the character regions determined to be subjected to the integration with each other (S2405) and also integrates the recognized characters with each other (S2406).

A specific example of the processing in S2404 to S2406 will be illustrated.

Ten character regions exist in the recognized cell 409 as follows.

SOLD TO—(1)
Kawasaki BlackBlue—(2)
Co., Ltd.—(3)
53, Imai Kamicho,—(4)
Nakahara-ku Kawasaki-shi,—(5)
Kanagawa, 211-8511—(6)
Tel—(7)
044-987-6543—(8)
Fax—(9)
044-98706544—(10)

The control unit 203 to which the position information of these character regions has been input determines that the two character regions including "Kawasaki BlackBlue" and "Co., Ltd." are integrated with each other to perform the integration of the circumscribed rectangles and the recognized characters in the character regions.

Next, the control unit 203 selects the character region to be displayed on the editing window 604 (S2407).

Selection conditions are set as follows. When the position of the mouse pointer 601 is on an inner side of a certain character region, the character region is selected. Furthermore, when the position of the mouse pointer 601 is not on an inner side of any character region, a character region having a shortest distance therefrom is selected. The control unit 203 displays the frame of the circumscribed rectangle of the integrated character region on the display unit 204 (S2408). This is carried out to clearly present to the user which character region can be selected from among the plurality of character regions in the recognized cell.

If the number of the character regions after the integral processing is 1, the single character region is confirmed, and the frame display processing may be skipped. In addition, a display method for the frames is changed to distinguish the character region selected by the control unit 203 in S2407 from the other character regions.

In the present specification, a bold line frame is used for the selected character region (for example, 2502) as illustrated in FIG. 25B, and a thin line frame is used for the other character region (for example, 2503), but any method may be employed as long as those character regions can be distinguished from each other. The control unit 203 displays the recognized character associated with the selected character region on the editing window (S2409).

FIG. 25B illustrates that the recognized characters "Kawasaki BlackBlue Co., Ltd." associated with the selected character region 2502 are displayed on the editing window 2501.

Detail of S904 (FIGS. 20 to 23)

A detail of S904 will be described by using FIGS. 20 to 23.

A single corresponding actual cell exists in the scanned image with respect to the recognized cell. Hereinafter, the actual cell of the scanned image will be referred to cell.

The position information of the recognized cell which is saved in the save unit 202 is coordinate information of the circumscribed rectangle. Because of an inclination and a distortion of the scanned image, the circumscribed rectangles (2303 and 2304) of the recognized cell are not wholly matched with the position of the cell. As illustrated in FIG. 23, in a case where the black pixel corresponding to a part of the ruled line 2301 of the cell is included on an inner side of the circumscribed rectangles (2303 and 2304) of the recognized cell, if the inside of the recognized cell is all deleted, a part of the ruled line of the cell is deleted. In view of the above-described concern, a step of deleting parts other than the ruled line of the cell inside the recognized cell without deleting the ruled line of the cell will be described below.

Figure 20:
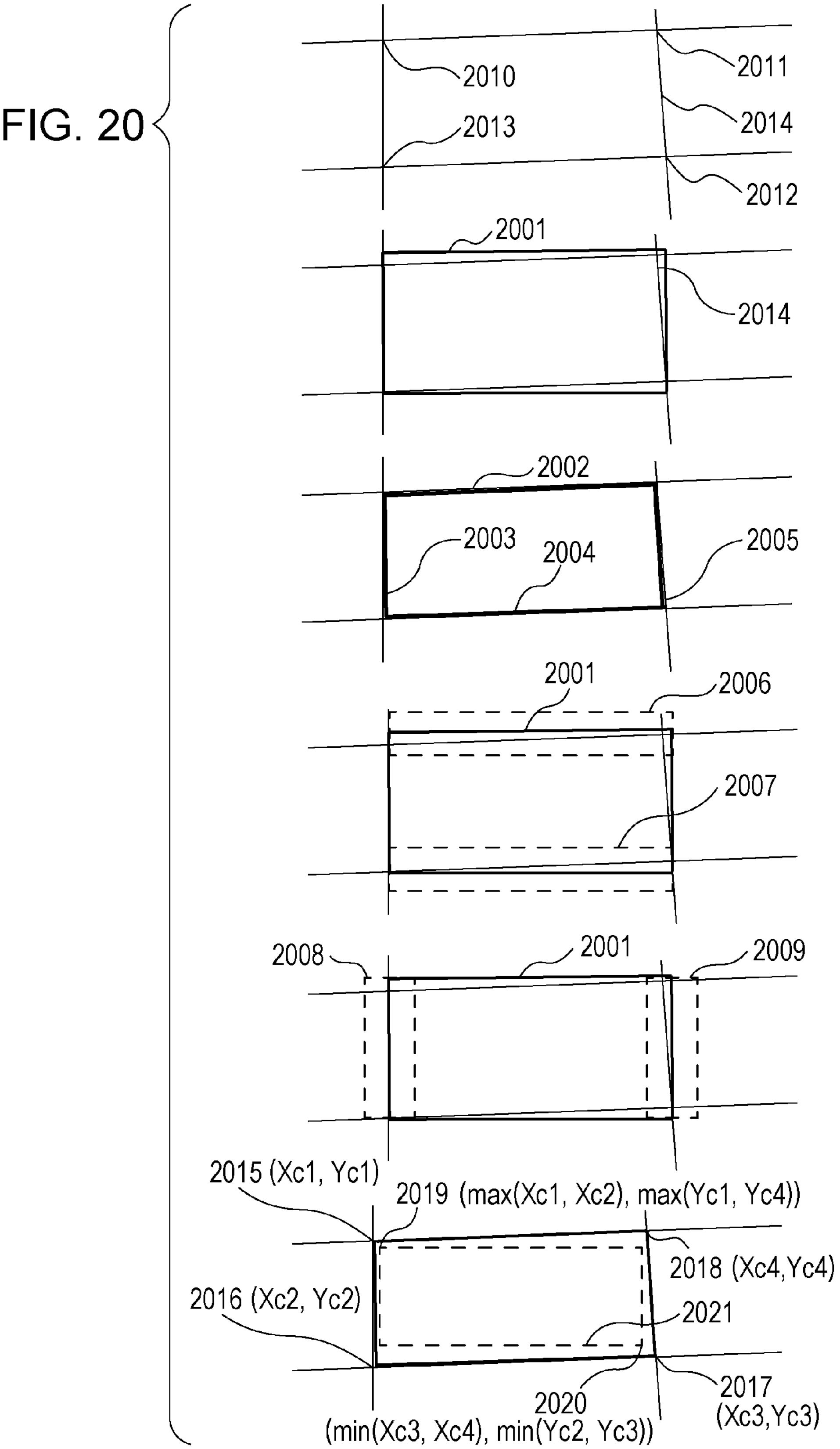
FIG. 20 illustrates a cell inscribed straight line detection region.

FIG. 20 illustrates a cell 2014. The cell 2014 is a region constituted by four ruled lines connecting four points with one another (2010 to 2013). A recognized cell 2001 corresponds to the cell 2014. A straight line inscribed to the cell 2014 will be referred to as cell inscribed straight line. Four upper, lower, left, and right cell inscribed straight lines (2002 to 2005) exist with respect to one cell.

A region for detecting the cell inscribed straight lines of the cell corresponding to the recognized cell 2001 is referred to as cell inscribed straight line detection region. Four cell inscribed straight line detection regions (2006 to 2009) exist with respect to one recognized cell.

In S2200, the control unit 203 identifies a deletion range. The deletion range is one of the character region, the recognized cells before the combination, and the recognized cell, and the control unit 203 identifies which range is to be deleted.

In a case where the plurality of character regions associated with the selected recognized cell exist, the control unit 203 determines that the deletion range is the character region and performs the processing in S2007. In a case where the plurality of the character regions associated with the recognized cell exist, if the inside of the recognized cell is all deleted, the character region that has not been subjected to the editing processing may also be deleted in some cases. Only the character region of the editing target can be deleted by this identification processing for the deletion range.

In a case where the selected recognized cell is the recognized cell after the combination and "delete the inside of the recognized cells before the combination" is selected with the radio button 1403, the control unit 203 determines that the deletion range is the recognized cells before the combination and performs the processing in S2006.

In the other cases, the control unit 203 determines that the deletion range is the recognized cell and performs the processing in S2201. This includes a case where the recognized cell is the recognized cell after the combination, and "delete the inside of the recognized cell after the combination" is selected with the radio button 1403. In this case, the recognized cell in the processings in S2201 to S2205 is set as the recognized cell after the combination. In S2201, the control unit 203 obtains the position information of the selected recognized cell 2001 from the save unit 202.

In S2206, the control unit 203 obtains the position information of the plurality of saved recognized cells before the combination associated with the selected recognized cell after the combination from the save unit 202. In this case, the recognized cells in S2202 to S2206 correspond to the recognized cells before the combination. The control unit 203 performs the respective processings in S2202 to S2205 with respect to the plurality of recognized cells before the combination and deletes the inside of each of the recognized cells before the combination.

In S2202, the control unit 203 sets the four in total of the upper, lower, left, and right cell inscribed straight line detection regions (2006 to 2009) of the recognized cell 2001.

The upper cell inscribed straight line detection region 2006 is a region around the side of the upper part of the recognized cell 2001. Specifically, for example, while the side of the upper part of the recognized cell 2001 is set as a reference, the region is obtained by enlarging the region vertically (that is, in a direction orthogonal to the side functioning as the reference) by a predetermined amount (for example, 20 pixels . . . 0.50 cm). The lower cell inscribed straight line detection region 2007 is set by a similar method to that for the upper part. The left cell inscribed straight line detection region 2008 is similarly a region around the side. Specifically, for example, while the side of the left part of the recognized cell is set as a reference, the region is obtained by enlarging the region horizontally by a predetermined amount. The right cell inscribed straight line detection region 2009 is set by a similar method to that for the left part. That is, the regions (2006 to 2009) in a predetermined range from the respective sides of the recognized cell 2001 are set as the cell inscribed straight line detection regions.

In S2203, the control unit 203 performs straight line detection with respect to the upper, lower, left, and right cell inscribed straight line detection regions (2006 to 2009). Hough transform is used for the straight line detection.

A method for the straight line detection by the Hough transform with respect to the upper cell inscribed straight line detection region 2006 will be specifically described.

First, the control unit 203 performs edge detection with respect to the upper cell inscribed straight line detection region 2006. Pixels are classified into an edge pixel in which a density difference with the upper, lower, left, and right pixels is higher than or equal to a threshold and the other non-edge pixel by the edge detection.

Figure 21:
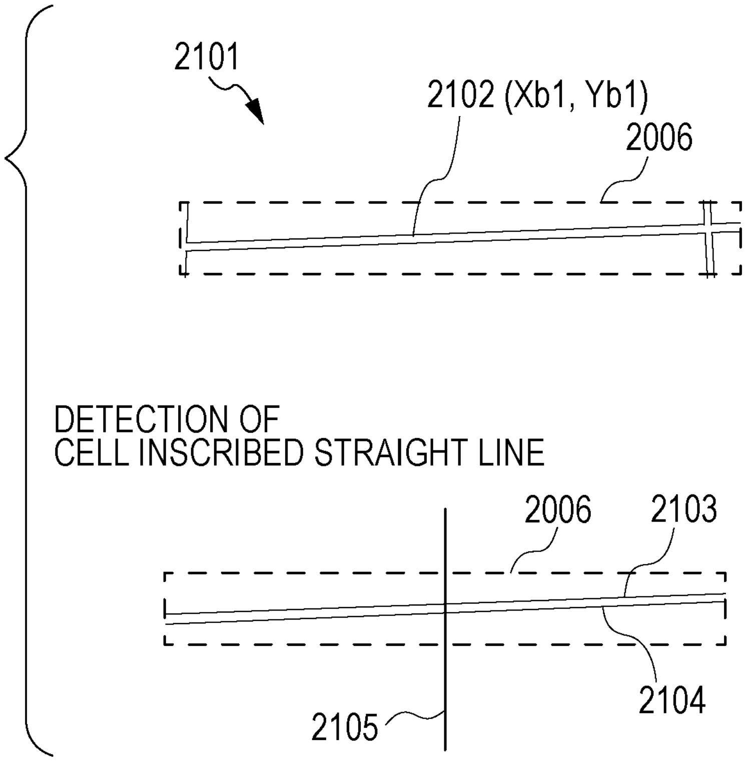
FIG. 21 illustrates detection of the cell inscribed straight line.

The edge detection is performed with respect to the upper cell inscribed straight line detection region 2006, and the edge pixel is displayed as the black pixel as denoted by 2101 in FIG. 21.

One edge pixel 2102 in the upper cell inscribed straight line detection region 2006 has coordinates (Xb1, Yb1). A straight line passing through (Xb1, Yb1) is represented by Expression 1. ρ denotes a length of a perpendicular drawn as a straight line from an origin, and θ denotes an angle defined by the x axis. ρi denotes an integer obtained by rounding off the first decimal place of ρ.

$$\rho = Xb1 \cos\theta + Yb1 \sin\theta \qquad \text{Expression 1}$$

Figure 19:
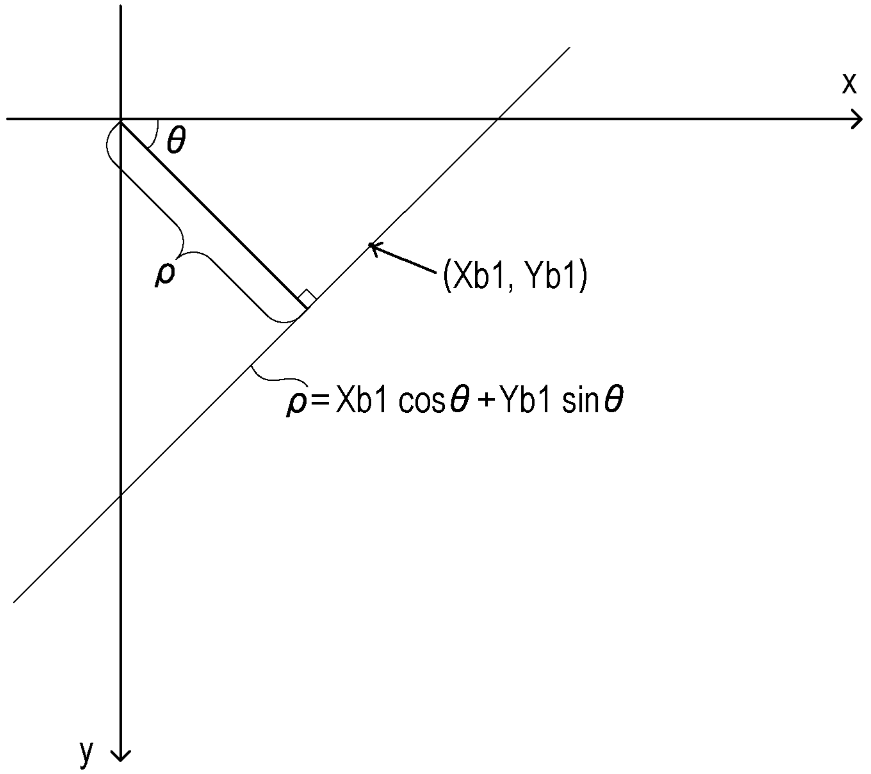
FIG. 19 is an explanatory diagram for describing a meaning of Expression 1.

FIG. 19 illustrates the straight line represented by this Expression 1.

The control unit 203 changes θ from 0 degrees to 360 degrees by a certain variation (for example, by 1 degree each) and calculates a value of ρ with respect to each θ, so that 360 combinations of (ρ, θ) of the straight line passing through (Xb1, Yb1) are obtained. The control unit 203 performs this processing in the upper cell inscribed straight line detection region 2006 with respect to all the edge pixels to obtain the number of edge pixels×360 combinations of (ρ, θ). If the number of edge pixels is 100, 36,000 combinations of (ρ, θ) are obtained. Among those, duplications (i.e. redundancies of the detected straight lines) exist of course. The number of duplications (redundancies) is obtained in a manner that combination of (ρ1, θ1) occurs 20 times, and the combination of (ρ2, θ2) occurs 30 times. That is, an occurrence rate of the combination of (ρi, θi) is obtained.

This occurrence rate is compared with a threshold, and the combination of (ρi, θi) exceeding the threshold is regarded as a numeric expression representing the straight line.

This threshold is a value obtained by multiplying the width of the cell inscribed straight line detection region by a previously set constant (for example, 0.7) in the case of the upper or lower cell inscribed straight line detection region. This threshold is a value obtained by multiplying the height of the cell inscribed straight line detection region by a previously set constant in the case of the left or right cell inscribed straight line detection region. As a result, in the example of FIG. 21, after the straight line detection is performed with respect to the edge image 2101, two straight lines 2103 and 2104 are detected. The detected straight lines 2103 and 2104 are indicated by the black pixels. The control unit 203 also respectively performs the straight line detection by similar methods with regard to the lower part, the left part, and the right part.

In S2204, the control unit 203 identifies the cell inscribed straight line (ruled line of the actual cell) on the basis of the result of the straight line detection in S2203. That is, the ruled line detection for the cell is performed.

For example, in the case of the upper cell inscribed straight line detection region, a plurality of (two) straight lines are detected from the upper cell inscribed straight line detection region 2006. Among these two straight lines, the straight line on the innermost side while the center position of the recognized cell is set as the reference, that is, the straight line in the lowermost part is detected as the cell inscribed straight line in the upper part of the recognized cell.

Mathematically, a value of the y coordinate of each of the detected straight lines (2103 and 2014) at the x coordinate 2105 of the center of the upper cell inscribed straight line detection region 2006 is calculated, and the straight line having a highest value of the y coordinate is identified as the cell inscribed straight line. In the example of FIG. 21, the straight line 2014 having the highest value of the y coordinate is identified as the cell inscribed straight line.

In a case where no straight line is detected in the upper cell inscribed straight line detection region, the control unit 203 identifies the side of the upper part of the recognized cell as the cell inscribed straight line. Of course, in a case where only one straight line is detected, this straight line is identified as the cell inscribed straight line.

The control unit 203 also respectively detects the innermost straight line as the cell inscribed straight line similarly with regard to the lower part, the left part, and the right part.

In S2205, the control unit 203 deletes the color information of the inside of the region surrounded by the four upper, lower, left, and right cell inscribed straight lines with respect to the scanned image. Specifically, the color information of the pixels inside the region is substituted with white.

When the color information of the inside of the region surrounded by the four upper, lower, left, and right cell inscribed straight lines is deleted, to simplify the processing, color information of a rectangular 2021 inside the region surrounded by the four cell inscribed straight lines may be deleted. A specific method of identifying the rectangular 2021 will be described below. An upper left intersection point 2015 of the cell inscribed straight line is set as (Xc1, Yc1), a lower left intersection point 2016 is set as (Xc2, Yc2), a lower right intersection point 2017 is set as (Xc3, Yc3), and an upper right intersection point is set as (Xc4, Yc4). A lower value among A and B is represented by min (A, B), and a higher value among A and B is represented by max (A, B). The rectangular 2021 is represented as a rectangular having upper left coordinates 2019 at (max (Xc1, Xc2), max (Yc1, Yc4)) and lower right coordinates 2020 at (min (Xc3, Xc4), min (Yc2, Yc3)). By deleting this color information of the inside of the rectangular, the color information of the rectangular 2021 inside the region surrounded by the four cells inscribed straight lines can be deleted.

In S2207, the control unit 203 obtains the position information of the character region of the editing target from the save unit 202 and deletes the color information of the inside of the character region. Specifically, the color information of the pixels inside the region is substituted with white.

The color other than the ruled line inside the recognized cell can be deleted without deleting the ruled line of the cell of the scanned image by the processings in S2200 to S2207.

Second Exemplary Embodiment

Figure 22:
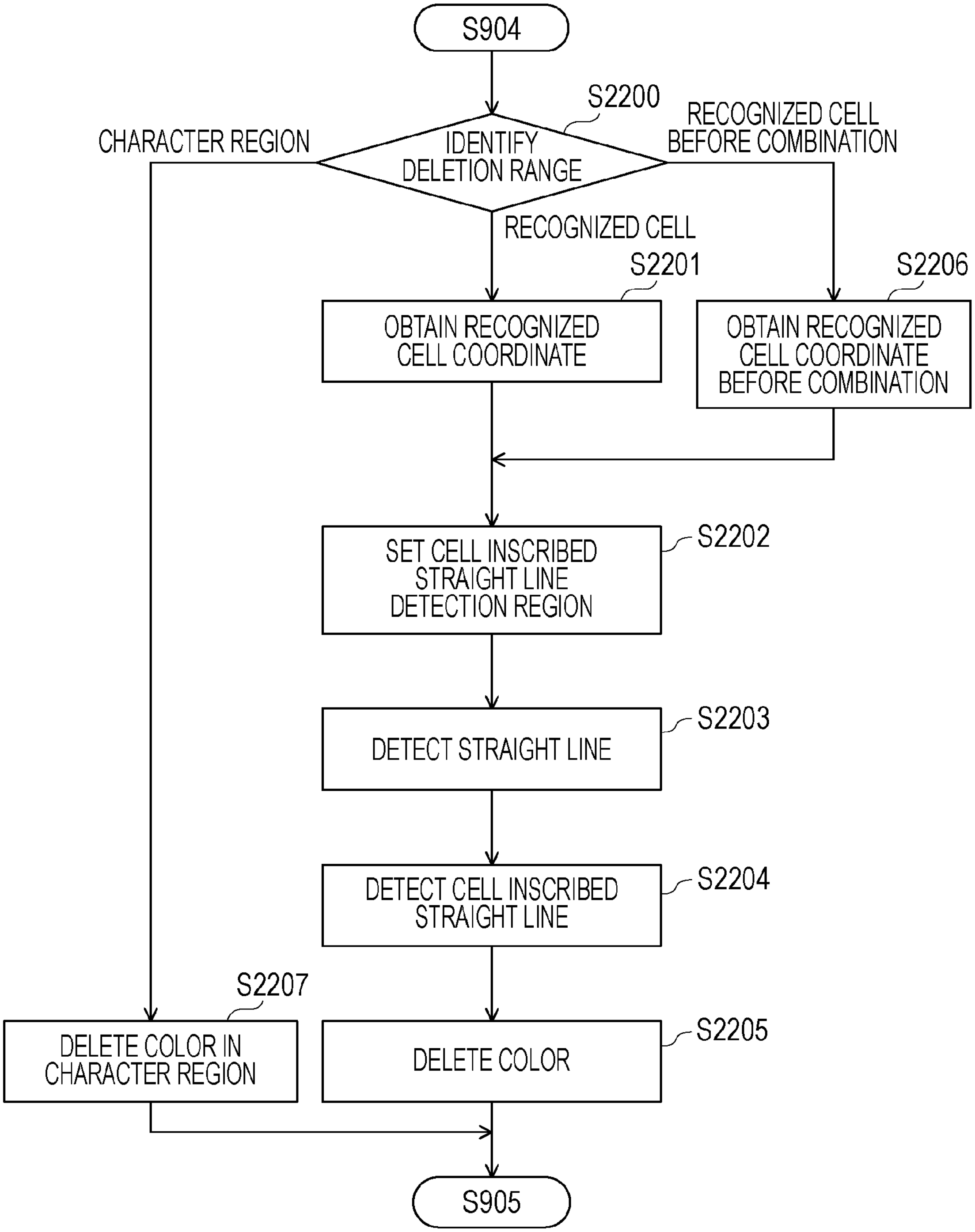
FIG. 22 is a flow chart for deleting an inside of the recognized cell.

In FIG. 22, after the color of the inside of the recognized cells before the combination is deleted, when the character after the editing is arranged in the recognized cell after the combination by the processing of FIG. 11, the ruled line of the cell of the scanned image which has not been deleted and the arranged character after the editing may be overlapped with each other in some cases. In such a case, when the character string after the editing is divided to be arranged in the recognized cells before the combination, it is possible to arrange the characters the scanned image while the ruled line of the cell and the character after the editing are not overlapped with each other. A specific method will be described below.

According to the present exemplary embodiment, to divide and arrange the character after the editing in the recognized cells before the combination, the position information of the recognized cells before the combination, the position information of the character region after the combination, the position information of the character regions before the combination, and the number of characters that can be arranged after the editing are associated with the recognized cell after the combination and saved. A specific method will be described below.

According to the first exemplary embodiment, when the character regions included in the recognized cell in S1506 are combined with each other, the control unit 203 deletes the position information of the plurality of character regions included in the recognized cells before the combination. According to the present exemplary embodiment, the control unit 203 associates the position information of the plurality of character regions included in the recognized cells before the combination with the position information of the recognized cells before the combination which is saved in S1505 and saved in the save unit 202. This will be described by using an example of FIG. 27.

Figure 27:
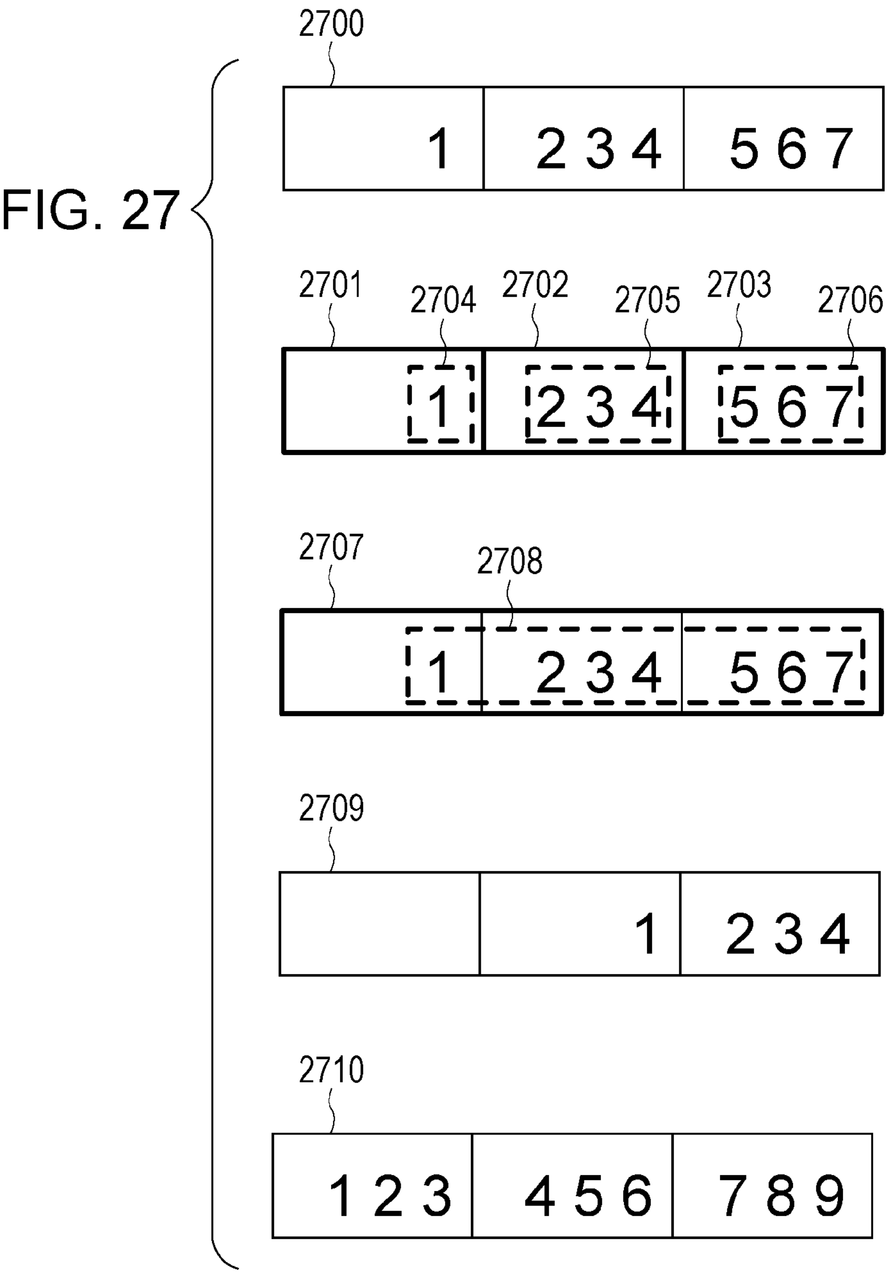
FIG. 27 is an explanatory diagram for describing arrangement of the character after the editing.

FIG. 27 illustrates a cell 2700 corresponding to a part of the scanned image, recognized cells 2701, 2702, and 2703 corresponding to results obtained by recognizing the cell 2700, and character regions 2704, 2705, and 2706 associated with the recognized cell. A cell 2707 is obtained by combining the recognized cells 2701, 2702, and 2703 with one another, and a cell 2708 is obtained by combining the character regions 2704, 2705, and 2706 with one another by operations by the user. In S1505, position information of the cell 2707 after the combination is saved, and position information of the recognized cells 2701, 2702, and 2703 before the combination is saved while being associated with the position information of the cell 2707. In S1506, position information of the character regions 2704, 2705, and 2706 is saved while being associated with the respective position information of the recognized cells 2701, 2702, and 2703.

According to the first exemplary embodiment, in S1507, when the recognized characters are combined with one another, the plurality of recognized characters before the combination are detected. In contrast to this, according to the present exemplary embodiment, the control unit 203 held the number of characters of the respective recognized characters before the combination in the save unit 202 as the number of characters that can be arranged after the editing while being associated with the position information of the plurality of recognized cells before the combination which is saved in S1505. The number of characters that can be arranged after the editing is used when the characters after the editing are actually arranged. In a case where the color of the inside of the recognized cells before the combination is deleted, the ruled line of the cell of the scanned image is often a ruled line delimiting the digits as denoted by 1404, and the ruled line for delimiting the digits is often common to the upper and lower cells. In order that the digits are aligned for the upper and lower cells to eliminate the sense of discomfort when the characters after the editing are arranged, the number of characters that can be arranged after the editing may be the same as the number of characters arranged before the editing. For this reason, the control unit 203 saves the number of characters of the respective recognized characters before the combination as the number of characters that can be arranged after the editing. In addition, the number of characters that can be arranged after the editing in the respective recognized cells before the combination is set again depending on the number of characters after the editing and a condition as to whether the character region after the combination in the recognized cell after the combination is the right adjustment or the left adjustment. A detail thereof will be described in the explanation of S2605.

The information saved in S1507 will be specifically described by using FIG. 27. In this example, information indicating that the number of the recognized character "1" is one is saved as the number of characters that can be arranged after the editing while being associated with the position information of the recognized cell 2701 before the combination. Similarly, information indicating that the number of the recognized characters "234" is three is saved as the number of characters that can be arranged after the editing in the save unit 202 while being associated with the position information of the recognized cell 2702. In addition, information indicating that the number of the recognized characters "567" is three is saved as the number of characters that can be arranged after the editing while being associated with the position information of the recognized cell 2703.

Figure 26:
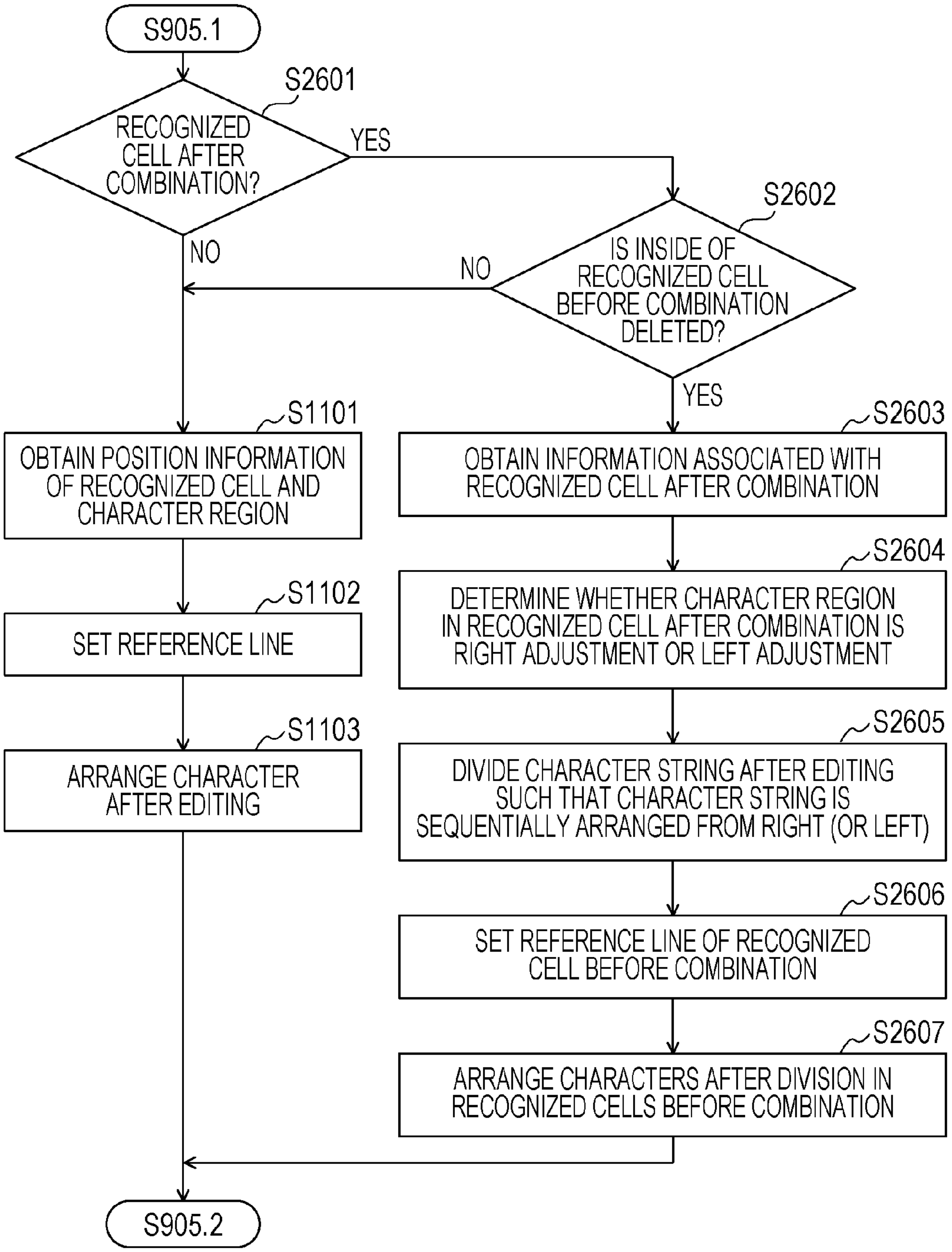
FIG. 26 is a flow chart for arranging the character after the editing.

FIG. 26 is a flow chart for the processing in S905.1 described in FIG. 11 according to the first exemplary embodiment in a case where the ruled line of the cell of the scanned image is not overlapped with the character after the editing. In S2601, the control unit 203 determines whether or not the selected recognized cell is the recognized cell after the combination. In a case where the control unit 203 determines that the selected recognized cell is not the recognized cell after the combination, the control unit 203 performs the processing in S1101 to S1103 similar to the processings in FIG. 11.

In a case where the control unit 203 determines that the selected recognized cell is the recognized cell after the combination, in S2602, the control unit 203 determines whether or not the inside of the recognized cells before the combination is deleted. In S2200, in a case where it is determined that the deletion range is the recognized cells before the combination, that is, a case where "delete the inside of the recognized cells before the combination" is selected in the radio button 1403, it is determined that the inside of the recognized cell is deleted.

When it is determined that the inside of the recognized cells before the combination is not deleted, the recognized cell after the combination is treated as the recognized cell, and the processings in S1101 to S1103 are performed. When it is determined that the inside of the recognized cells before the combination is deleted, the control unit 203 obtains information associated with the recognized cell after the combination in S2603 from the save unit 202. The information associated with the recognized cell after the combination refers to the position information of the recognized cells before the combination, the position information of the character region after the combination, the position information of the character regions before the combination, and the number of characters that can be arranged after the editing. In S2604, the control unit 203 determines whether the character region in the recognized cell after the combination is the right adjustment or the left adjustment by using the recognized cell after the combination and the position information of the character region after the combination. The determination method as to whether the character region is the right adjustment or the left adjustment is the method similar to S1102, and the reference line is identified by using the recognized cell after the combination and the character region after the combination. In a case where the reference line is the right side, it is determined that the character region is the right adjustment, and in a case where the reference line is the left side of the character region, it is determined that the character region is the left adjustment.

When it is determined in S2604 that the character region is the right adjustment, in S2605 to S2607, the characters after the editing are sequentially arranged from the right side of the recognized cells before the combination. On the other hand, when it is determined that the character region is the left adjustment, the characters after the editing are sequentially arranged from the left side of the recognized cells before the combination. Hereinafter, in the explanations of S2605 to S2607, the case where it is determined that the character region is the right adjustment will be described, but the similar processing is performed also when it is determined that the character region is the left adjustment.

When it is determined in S2604 that the character region is the right adjustment, in S2605, the control unit 203 sequentially selects the recognized cells before the combination from the right side of the recognized cells before the combination, that is, in the descending order of the value of the x coordinate of the right side of the recognized cells before the combination. The control unit 203 selects from the right side of the characters after the editing to be arranged by the number of characters that can be arranged which is associated with the recognized cells before the combination in the order of the selection and determines the character string to be arranged in the respective recognized cells before the combination.

This processing will be specifically described by using FIG. 27. A cell 2709 corresponds to a case where "1234" is arranged as the character string after the editing in the region in which "1234567" is described like the cell 2700. In this case, the value of the x coordinate on the right side of the recognized cells before the combination is highest in the recognized cell 2703, then the recognized cell 2702, and the recognized cell 2701 in the descending order. Therefore, from the information indicating that three characters associated with the recognized cell 2703 can be arranged in the recognized cell 2703 where the value of the x coordinate is the highest, the control unit 203 determines that "234" corresponding to the three characters from the right side among "1234" are arranged. From the information indicating that three characters associated with the recognized cell 2702 can be arranged where the value of the x coordinate of the right side is the second highest, the control unit 203 determines that the remaining one character is arranged in the recognized cell 2702.

In a case where the number of characters of the character string after the editing is higher than a number obtained by even adding all the numbers of characters that can be arranged which are associated with the recognized cells before the combination to one another, the control unit 203 determines that the remaining characters are arranged in the recognized cell on the leftmost side (the rightmost side in the case of the left adjustment) among the recognized cells before the combination. Specifically, the control unit 203 divides the recognized cell where the value of the x coordinate of the right side the character regions before the combination is the lowest such that the characters are arranged.

Specific descriptions will be given by using FIG. 27. A cell 2710 corresponds to a case where "123456789" is arranged as the character string after the editing in a region in which "1234567" is described like the cell 2700. In this case, the control unit 203 determines that "789" corresponding to the three characters from the right of the character after the editing are arranged in the recognized cell 2703 where the value of the x coordinate is the highest. Similarly, the control unit 203 performs the division to arrange "456" corresponding to the three characters from the right of the remaining character string in the recognized cell 2702. Next, although the information indicating one character is associated with the recognized cell 2701, since the character region 2704 is the recognized cell where the value of the x coordinate is the lowest, the control unit 203 determines that all the three characters "123" corresponding to the remaining character string are arranged. By this processing, the character string after the editing is divided to determine which character string is arranged in which recognized cell.

In S2606, the control unit 203 sets the reference line by using the position information of the respective recognized cells before the combination and the position information of the character regions before the combination. The setting of the reference line is performed by the method similar to the identification of the reference line in S1102. In S2607, the control unit 203 arranges the character strings after the division which is determined to be arranged in the respective recognized cells before the combination in S2605. For the method of arranging the character strings, the method similar to S1103 is used for the arrangement.

As in the present exemplary embodiment, since the character string after the editing is divided to be arranged in the recognized cells before the combination, even in a case where the color of the inside of the recognized cells before the combination is deleted, it is possible to arrange the characters in a manner that the ruled line of the cell of the scanned image is not overlapped with the character after the editing.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-139868, filed Jul. 7, 2014, and Japanese Patent Application No. 2014-209332, filed Oct. 10, 2014, which are hereby incorporated by reference herein in their entirety.

What is claimed is:

1. An information processing apparatus comprising:

a processor; and a memory for storing a program, wherein the processor executes the program to perform:

obtaining a document image;

setting a recognized cell in a table region included in the document image;

detecting straight lines from regions around four sides that constitute the recognized cell; and deleting, in the document image, color information of an inside of a region surrounded by the detected four straight lines.

2. The information processing apparatus according to claim 1, wherein the regions around the four sides constituting the recognized cell are regions enlarged in orthogonal directions to respective sides while the respective sides are set as references.

3. The information processing apparatus according to claim 1, wherein the straight line is an edge of a ruled line of an original cell corresponding to the recognized cell.

4. The information processing apparatus according to claim 3, wherein the detecting includes an edge detection to detect edge pixels from the regions around the four sides, and a ruled line detection to detect the straight lines based on a number of duplications of lines passing through the detected respective edge pixels.

5. The information processing apparatus according to claim 4, wherein, in a case where a plurality of lines are detected from the region around one side, an innermost line is detected as the straight line among the plurality of lines while a center position of the recognized cell is set as a reference.

6. The information processing apparatus according to claim 1, wherein the recognized cell is set based on a circumscribed rectangle of a white pixel block detected from a table region included in the document image.

7. The information processing apparatus according to claim 1, wherein the recognized cell is set at a position operated by a user in the table region included in the document image.

8. The information processing apparatus according to claim 1, wherein the deleting substitutes the color information of the inside of the region surrounded by the detected four straight lines with default color, wherein the default color is white or a background color of the region.

9. The information processing apparatus according to claim 1, wherein the obtained document image is a scanned image generated by scanning a document.

10. An information processing method executed by an information processing apparatus, wherein the information processing method comprising:

obtaining a document image;

setting a recognized cell inside a table region included in the document image;

detecting straight lines from regions around four sides that constitute the recognized cell; and deleting color information of an inside of a region surrounded by the detected four straight lines.

11. The information processing method according to claim 10, wherein the regions around the four sides constituting the recognized cell are regions enlarged in orthogonal directions to the respective sides while the respective sides are set as references.

12. The information processing method according to claim 10, the straight line is an edge of a ruled line of an original cell corresponding to the recognized cell.

13. The information processing method according to claim 10, wherein the detecting includes an edge detection to detect edge pixels from the regions around the four sides, and a ruled line detection to detect the straight lines on the basis of a number of duplications of straight lines passing through the detected respective pixels.

14. The information processing method according to claim 13, wherein, in a case where a plurality of lines are detected from the region around one side, an innermost line is detected as the straight line among the plurality of lines while a center position of the recognized cell is set as a reference in the ruled line detection.

15. The information processing method according to claim 10, wherein the recognized cell is set based on a circumscribed rectangle of a white pixel block detected from the table region included in the document image.

16. The information processing method according to claim 10, wherein the recognized cell is set at a position operated by a user in the table region included in the document image.

17. A non-transitory computer-readable medium storing instructions that, when executed by a processor, cause the processor to perform operations comprising:

obtaining a document image;

setting a recognized cell inside a table region included in the document image;

detecting straight lines from regions around four sides that constitute the recognized cell; and deleting color information of an inside of a region surrounded by the detected four straight lines.

18. The non-transitory computer-readable medium according to claim 17, wherein the regions around the four sides constituting the recognized cell are regions enlarged in orthogonal directions to respective sides while the respective sides are set as references.

19. The non-transitory computer-readable medium according to claim 17, wherein the straight line is an edge of a ruled line of an original cell corresponding to the recognized cell.

20. The non-transitory computer-readable medium according to claim 19, wherein the detecting includes an edge detection to detect edge pixels from the regions around the four sides, and a ruled line detection unit to detect the straight lines based on a number of duplications of lines passing through the detected respective edge pixels.

21. The non-transitory computer-readable medium according to claim 17, wherein the recognized cell is set based on a circumscribed rectangle of a white pixel block detected from the table region included in the document image.

22. The non-transitory computer-readable medium according to claim 17, wherein the recognized cell is set at a position operated by a user in the table region included in the document image.

* * * * *